(12) United States Patent
Arduini

(10) Patent No.: US 10,247,262 B2
(45) Date of Patent: Apr. 2, 2019

(54) VARIABLE AND CENTRIFUGAL FLYWHEEL AND CENTRIFUGAL CLUTCH

(75) Inventor: Douglas P. Arduini, San Ramon, CA (US)

(73) Assignee: Douglas P. Arduini, San Ramon, CA (US)

( * ) Notice: Subject to any disclaimer, the term of this patent is extended or adjusted under 35 U.S.C. 154(b) by 1129 days.

(21) Appl. No.: 12/702,106

(22) Filed: Feb. 8, 2010

(65) Prior Publication Data

US 2010/0135767 A1    Jun. 3, 2010

Related U.S. Application Data

(63) Continuation-in-part of application No. 12/079,489, filed on Mar. 27, 2008, now Pat. No. 7,843,077.
(Continued)

(51) Int. Cl.
*F16D 41/12*    (2006.01)
*F03D 15/10*    (2016.01)
(Continued)

(52) U.S. Cl.
CPC ............... *F16D 41/12* (2013.01); *F03D 9/12* (2016.05); *F03D 15/00* (2016.05); *F03D 15/10* (2016.05);
(Continued)

(58) Field of Classification Search
CPC . F16D 41/12; F03D 9/12; F03D 15/00; Y10T 74/2128; Y10T 74/2132; F05B 2260/421
(Continued)

(56) References Cited

U.S. PATENT DOCUMENTS 505,827 A * 10/1893 Hall et al. ............... F16D 43/10
                                                    192/105 CS
964,374 A *  7/1910 Bey .......................... F03D 3/00
                                                    415/18
(Continued)

FOREIGN PATENT DOCUMENTS

EP    0294514 A2    12/1988
EP    1804361 A1     7/2007
(Continued)

OTHER PUBLICATIONS

Title: Flywheel Energy Storage URL: http://www.upei.ca/~physics/p261/projects/flywheel1/flywheel1.htm Date: Jun. 10, 2008; 3 Pages.
(Continued)

*Primary Examiner* — Dwayne J White
*Assistant Examiner* — Adam W Brown
(74) *Attorney, Agent, or Firm* — Bowen Liu; Ying Jiang; David Lewis

(57) ABSTRACT

A flywheel is attached to a shaft of a turbine. As the shaft rotates, the flywheel swings outwards away from the shaft and regulates the angular velocity of the rotating shaft. In an embodiment, there are multiple flywheels attached to the shaft. In another embodiment there is a first flywheel that controls a second flywheel. In another embodiment, the flywheel has adjustable or centrifugal displacement of counterbalanced masses for effective rotational diameter with effective rotational balance. In another embodiment, a small pilot centrifugal displacement flywheel may control a clutch by rotational velocity and may include a hysteresis control. An example of a clutch may limit that degree to which the arms of the flywheel may be extended and/or retracted. In another embodiment, a small pilot centrifugal displacement flywheel controls the hysteresis of a centrifugal flywheel displacement.

28 Claims, 25 Drawing Sheets

Related U.S. Application Data

(60) Provisional application No. 60/930,599, filed on May 16, 2007.

(51) Int. Cl.
| | |
|---|---|
| *F16D 43/04* | (2006.01) |
| *F03D 15/00* | (2016.01) |
| *F03D 9/12* | (2016.01) |
| *F03D 80/70* | (2016.01) |

(52) U.S. Cl.
CPC .............. *F16D 43/04* (2013.01); *F03D 80/70* (2016.05); *F05B 2240/133* (2013.01); *F05B 2260/4023* (2013.01); *Y02E 10/72* (2013.01); *Y02E 60/16* (2013.01); *Y10T 74/2128* (2015.01)

(58) Field of Classification Search
USPC ...... 416/60; 415/121.1, 124.1, 18; 74/572.1, 74/572.2, 572.4, 570.1, 574.2, 574.3, 74/574.4
See application file for complete search history.

(56) References Cited

U.S. PATENT DOCUMENTS

| | | | |
|---|---|---|---|
| 1,025,428 A | 5/1912 | Stanschus | |
| 1,342,318 A * | 6/1920 | Yanacopoulos | F03D 3/065 416/197 A |
| 1,466,026 A * | 8/1923 | Manning | F03D 3/065 416/32 |
| 1,537,369 A | 5/1925 | Nicholson | |
| 2,027,950 A | 1/1933 | Young | |
| 1,941,611 A * | 1/1934 | Manikowske | F03D 15/00 188/180 |
| 2,539,862 A | 1/1951 | Rushing | |
| 2,826,121 A | 3/1958 | Dodich | |
| 3,339,078 A | 8/1967 | Crompton | |
| 3,726,040 A | 4/1973 | Cranston | |
| 3,736,740 A | 6/1973 | Pindell, Jr. | |
| 3,743,848 A | 7/1973 | Strickland | |
| 3,883,750 A | 5/1975 | Uzzell, Jr. | |
| 3,891,347 A * | 6/1975 | Jacobs | F03D 15/00 416/169 R |
| 3,944,840 A | 3/1976 | Troll | |
| 4,005,540 A | 2/1977 | Robinson | |
| 4,009,536 A | 3/1977 | Wolff | |
| 4,021,135 A | 5/1977 | Pedersen et al. | |
| 4,075,500 A | 2/1978 | Oman et al. | |
| 4,087,196 A | 5/1978 | Kronmiller | |
| 4,140,433 A | 2/1979 | Eckel | |
| 4,313,710 A * | 2/1982 | La Ferte | F03D 3/0409 415/4.2 |
| 4,357,542 A | 11/1982 | Kirschbaum | |
| 4,443,155 A | 4/1984 | Smith | |
| 4,461,957 A | 7/1984 | Jallen | |
| 4,464,579 A | 8/1984 | Schwarz | |
| 4,483,657 A | 11/1984 | Kaiser | |
| 4,613,763 A | 9/1986 | Swansen | |
| 4,620,834 A * | 11/1986 | Baird | F03D 7/06 416/169 R |
| 4,674,469 A | 6/1987 | Peck | |
| 4,749,892 A | 6/1988 | Mesenich | |
| 4,754,567 A | 7/1988 | Lehfeldt et al. | |
| 4,908,970 A | 3/1990 | Bell | |
| 5,161,952 A | 11/1992 | Eggers, Jr. | |
| 5,219,454 A | 6/1993 | Class | |
| 5,269,197 A * | 12/1993 | Yang | F16F 15/31 74/570.2 |
| 5,293,090 A | 3/1994 | Heilman et al. | |
| 5,299,374 A | 4/1994 | Mathys | |
| 5,663,631 A | 9/1997 | Kajiura et al. | |
| 5,744,883 A | 4/1998 | Lewis et al. | |
| 5,852,891 A | 12/1998 | Onishi et al. | |
| 6,246,126 B1 | 6/2001 | Van Der Veken et al. | |
| 6,285,090 B1 | 9/2001 | Brutsaert et al. | |
| 6,285,178 B1 | 9/2001 | Ball et al. | |
| 6,516,791 B2 | 2/2003 | Perrone | |
| 6,705,340 B1 | 3/2004 | McGill et al. | |
| 6,710,489 B1 | 3/2004 | Gabrys | |
| 6,720,674 B1 | 4/2004 | Gabrys | |
| 6,794,777 B1 | 9/2004 | Fradella | |
| 6,801,389 B1 | 10/2004 | Berding et al. | |
| 6,825,588 B2 | 11/2004 | Gabrys et al. | |
| 6,882,072 B2 | 4/2005 | Wingett et al. | |
| 7,018,166 B2 | 3/2006 | Gaskell | |
| 7,018,324 B1 | 3/2006 | Lin | |
| 7,040,859 B2 * | 5/2006 | Kane | 415/4.2 |
| 7,094,018 B2 | 8/2006 | Grubb | |
| 7,109,622 B2 | 9/2006 | Khalizadeh | |
| 7,245,039 B2 | 7/2007 | DuHamel | |
| 7,259,471 B2 | 8/2007 | Basteck | |
| 7,635,923 B2 | 12/2009 | DeAngeles | |
| 7,843,077 B2 | 11/2010 | Arduini | |
| 8,522,466 B2 | 9/2013 | Arduini | |
| 2001/0043019 A1 | 11/2001 | Heyden et al. | |
| 2002/0096164 A1 | 7/2002 | Perrone | |
| 2003/0155831 A1 | 8/2003 | Gabrys et al. | |
| 2003/0178972 A1 | 9/2003 | Burstall | |
| 2004/0012277 A1 | 1/2004 | Gabrys | |
| 2004/0256929 A1 | 12/2004 | Gabrys et al. | |
| 2005/0011505 A1 | 1/2005 | Nygaard et al. | |
| 2005/0040776 A1 | 2/2005 | Sibley | |
| 2006/0061334 A1 | 3/2006 | Pollack et al. | |
| 2007/0051353 A1 | 3/2007 | Nygarrd et al. | |
| 2007/0079539 A1 | 4/2007 | Karagias | |
| 2007/0181116 A1 | 8/2007 | Wei | |
| 2008/0174166 A1 * | 7/2008 | Kalil | 301/5.1 |
| 2008/0223684 A1 | 9/2008 | Duffey et al. | |
| 2010/0024273 A1 | 2/2010 | Duperry et al. | |
| 2012/0131832 A1 | 5/2012 | Arduini | |

FOREIGN PATENT DOCUMENTS

| | | |
|---|---|---|
| EP | 15653371 B1 | 8/2007 |
| JP | 2004096990 A | 3/2004 |
| JP | 2004166487 A | 6/2004 |
| KR | 20050095620 A | 9/2005 |
| MX | PA04002435 A | 4/2005 |
| MX | PA02004945 A | 7/2005 |
| SU | 780142 B | 11/1980 |
| WO | WO 8301279 A1 | 4/1983 |
| WO | WO 9507193 A1 | 3/1995 |
| WO | WO 9605646 A2 | 2/1996 |
| WO | WO 2003/021738 A2 | 3/2003 |
| WO | WO 2003/023942 A1 | 3/2003 |
| WO | WO 2004/063688 A2 | 7/2004 |
| WO | WO 2008037004 A1 * | 4/2008 |

OTHER PUBLICATIONS

Title: Flywheels and Energy Storage URL: http://zebu.uoregon.edu/1996/ph162/l10a.html Date: Jun. 10, 2008; 5 Pages.

Title: Alternative Energy Storage Methods URL: http://www.mpoweruk.com/alternatives.htm Date: Jun. 10, 2008; 6 Pages.

Title: Flywheels—Electricity Storage Association URL: http://www.electricitystorage.org/tech/technologies_technologies_flywheels.htm Date: Jun. 10, 2008; 2 Pages.

Title: Federal Technolgy Alert—Flywheel Energy Storage URL: www.eere.energy.gov/femp/ pp. 16.

* cited by examiner

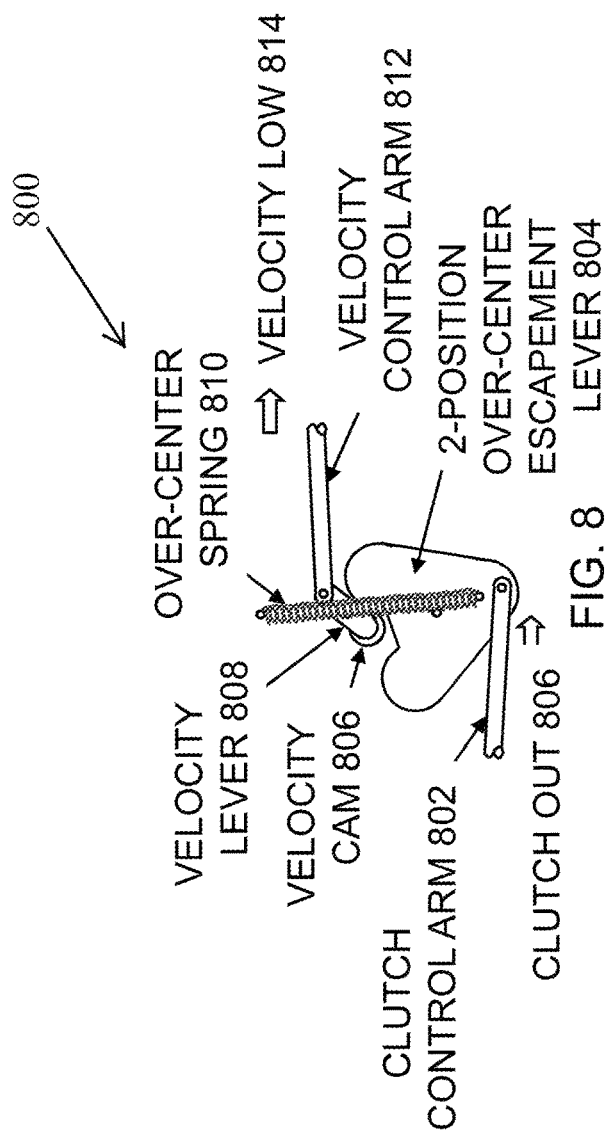
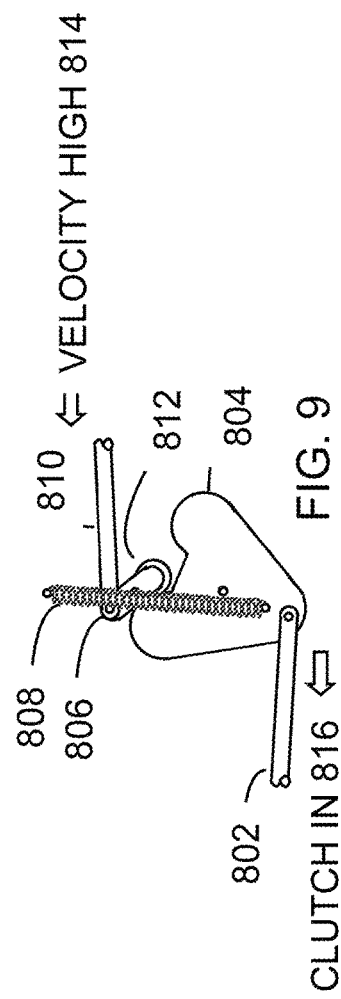

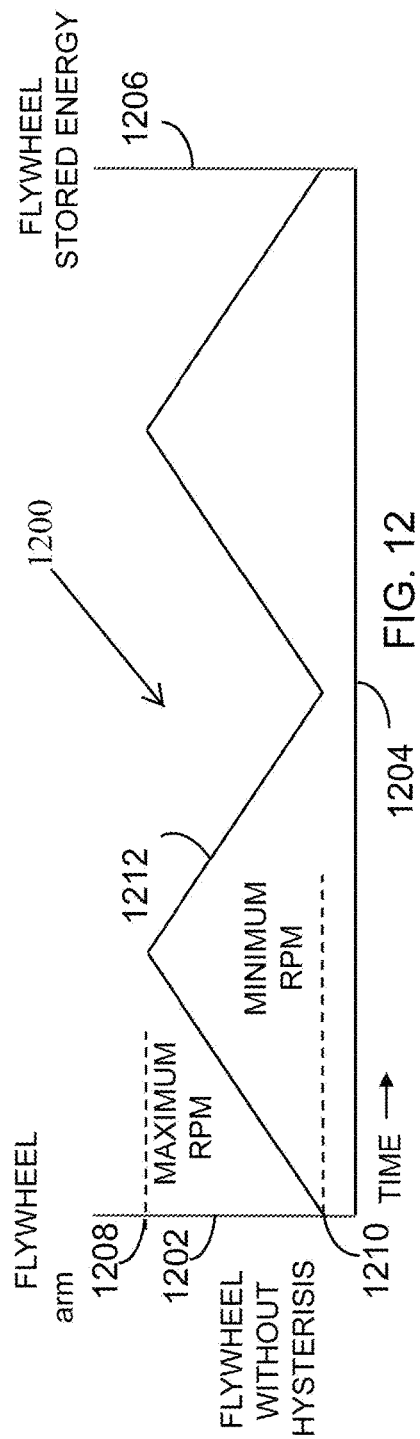
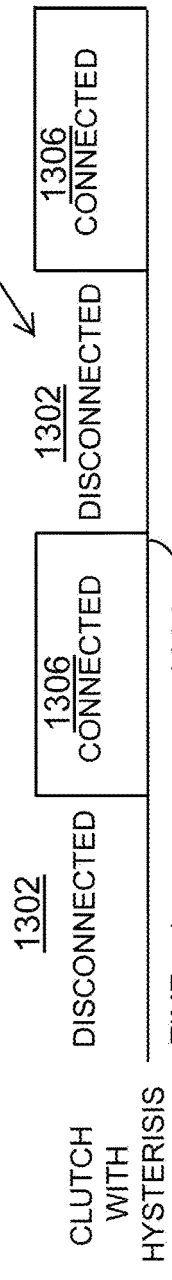
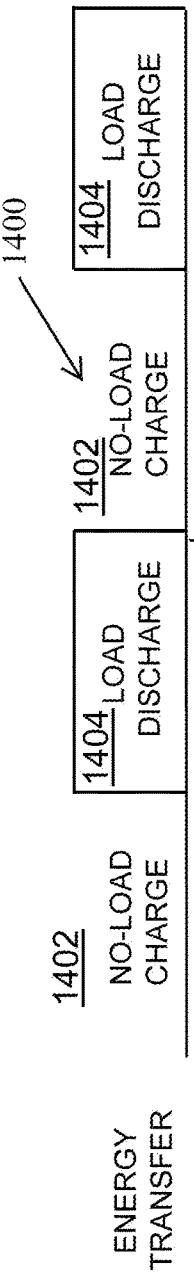
FIG. 12
FIG. 13
FIG. 14

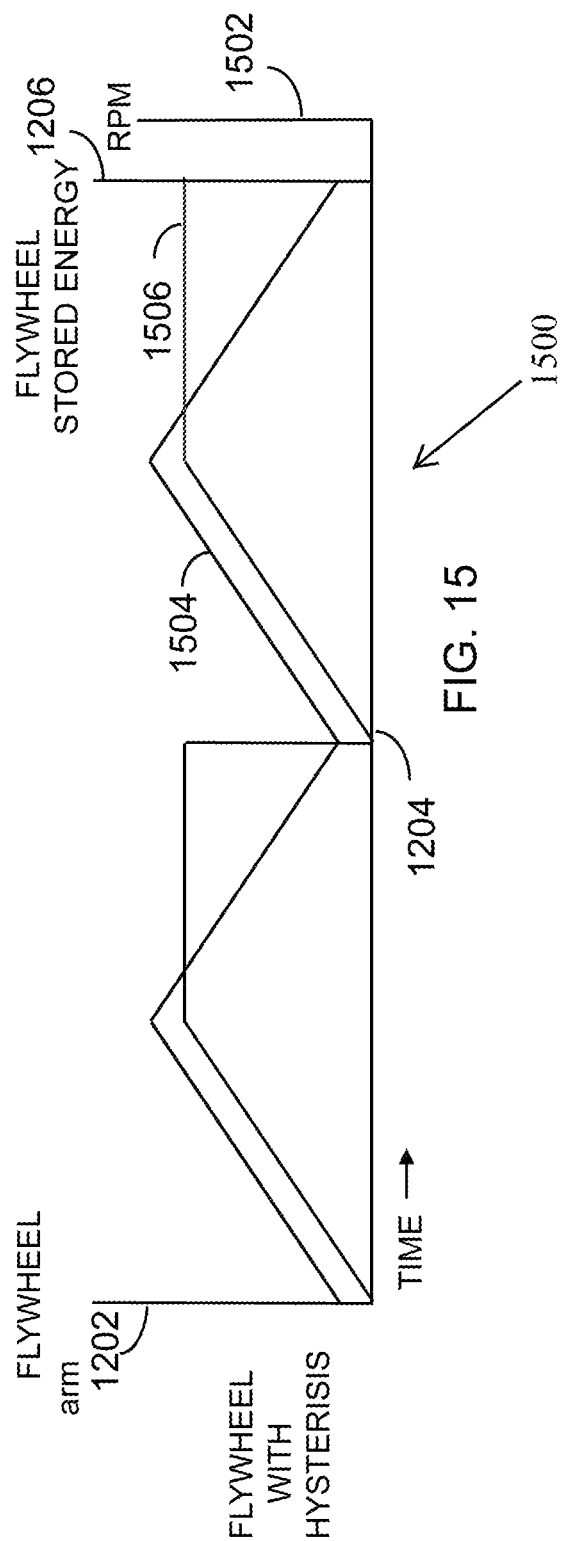

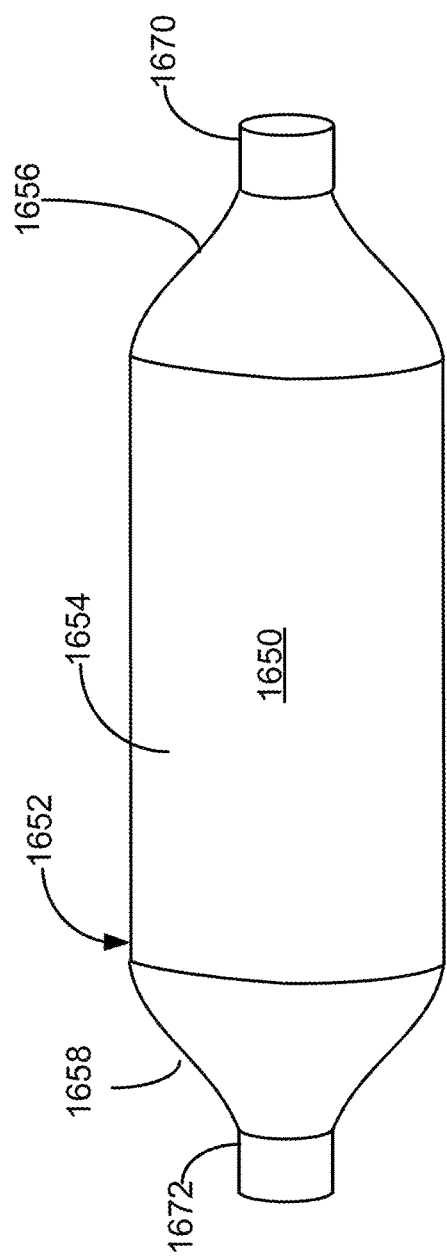

| VARIABLE RPM, CONSTANT FLYWHEEL RADIUS | | | | | | | |
|---|---|---|---|---|---|---|---|
| ENTER | | | | | | | UNITS |
| | M | 10 | 10 | 10 | 10 | 10 | pounds |
| | r | 1 | 1 | 1 | 1 | 1 | inches |
| | rpm | 10 | 20 | 30 | 40 | 50 | 60 | rpm |
| CALCULATION | | | | | | | |
| | E | 5 | 22 | 49 | 88 | 137 | 197 | inch-pounds |
| | dE | 0 | 16 | 27 | 38 | 49 | 60 | |

FIG. 17B

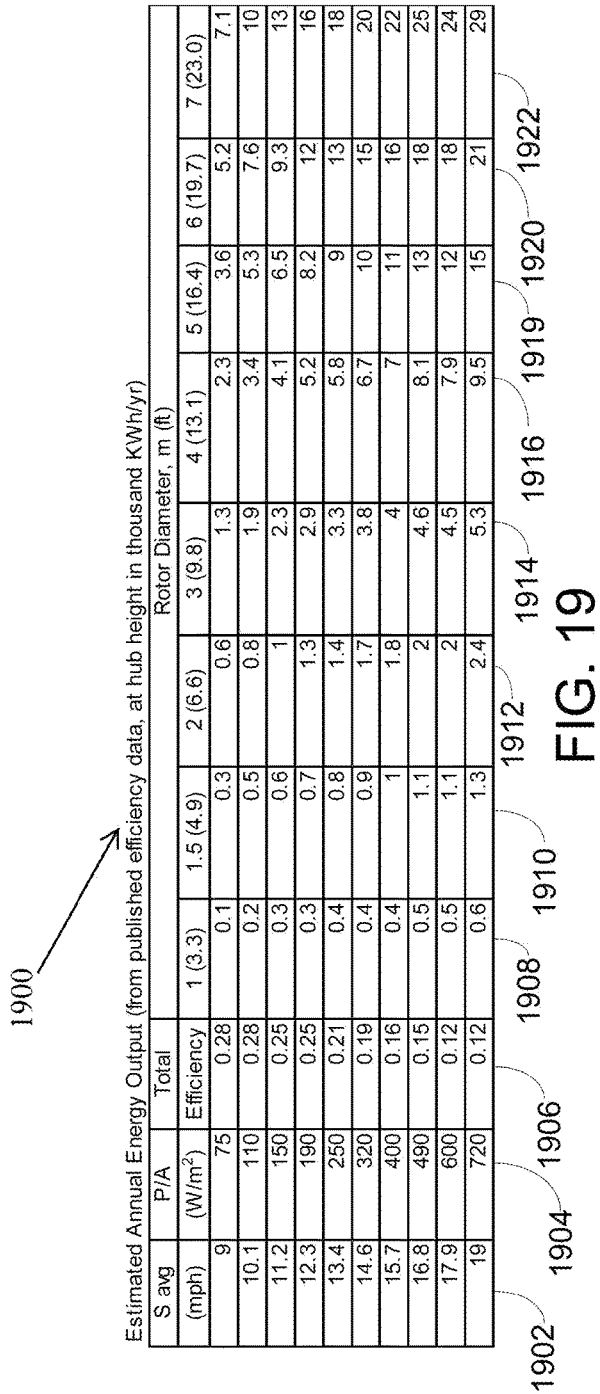

VARIABLE AND CENTRIFUGAL FLYWHEEL AND CENTRIFUGAL CLUTCH

CROSS-REFERENCE TO RELATED APPLICATIONS

This application is a continuation in part of U.S. patent application Ser. No. 12/079,489, filed Mar. 27, 2008, now U.S. Pat. No. 7,843,077 which claims benefit of Provisional Patent Application 60/930,599, filed May 16, 2007, both of which are incorporated herein by reference.

FIELD

This specification relates to controlling turbines.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Currently, wind turbines need to be shutdown during high winds, because operating the turbine in high winds may damage the turbine as a result of the high speed at which the turbine rotates in the high winds. Similarly, other types of turbines can be improved.

BRIEF DESCRIPTION OF THE FIGURES

In the following drawings like reference numbers are used to refer to like elements. Although the following figures depict various examples of the invention, the invention is not limited to the examples depicted in the figures.

FIGS. 8 and 9 show an embodiment of a clutch control that may be controlled by the flywheel in FIGS. 6 and 7.

FIG. 12 shows a graph of the angular rotation as a function of time.

FIG. 13 shows a graph that plots when the clutch is connected and disconnected.

FIG. 14 shows a graph that plots when the turbine of FIGS. 10 and 11A charges and discharges.

FIG. 15 shows a graph that plots when the turbine of FIGS. 10 and 11A stores and dissipates energy.

FIG. 16B shows an embodiment of an assembly that may be used in the generator system of FIG. 1 in which the flywheel is covered.

FIG. 17B shows a table of the change in energy as the rotational velocity increases with a changing flywheel displacement.

FIG. 18 shows a table of power densities of various configurations of turbines.

FIG. 19 shows a table of power density output of various turbine configurations.

DETAILED DESCRIPTION

Figure 1A:
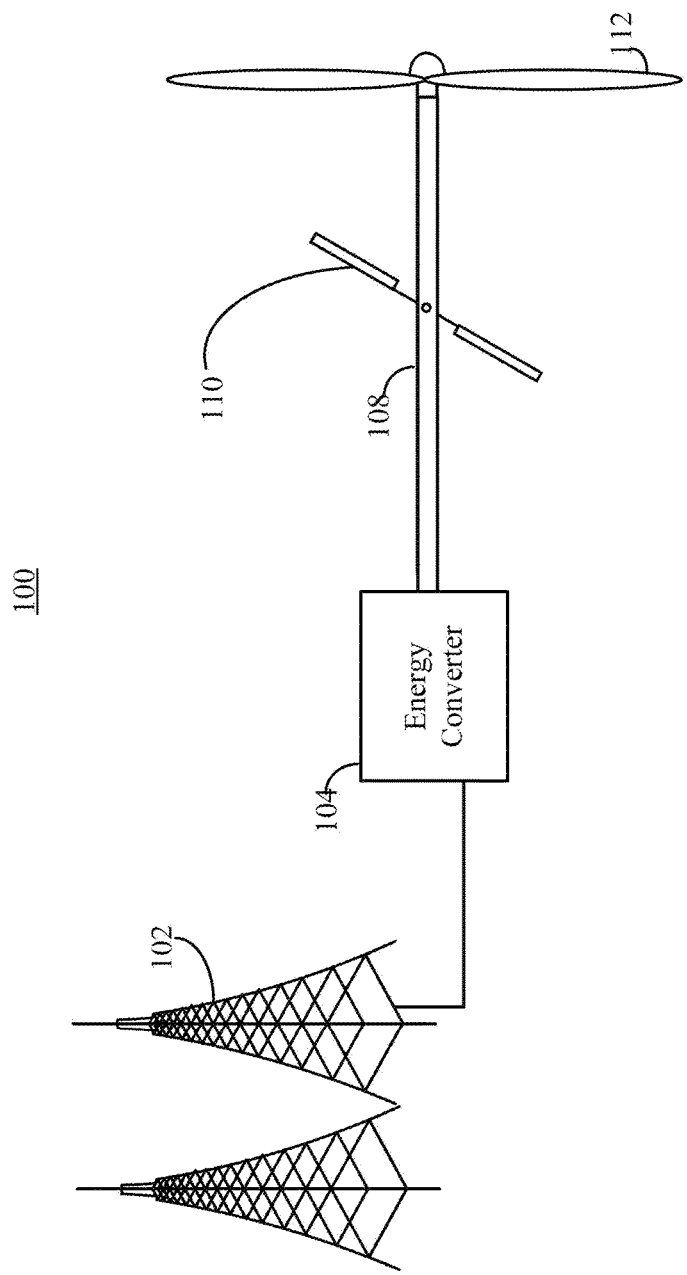
FIG. 1A shows a diagram of an embodiment of generator system having one or more flywheels.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-19 is a brief description of each element, which may have no more than the name of each of the elements in the particular figure that is being discussed. After the brief description of each element, each element of FIGS. 1-21 is further discussed in numerical order. In general, each of FIGS. 1-21 is discussed in numerical order, and the elements within FIGS. 1-21 are also usually discussed in numerical order to facilitate easily locating the discussion of a particular element. Nonetheless, there is not necessarily any one location where all of the information of any element of FIGS. 1-21 is located. Unique information about any particular element or any other aspect of any of FIGS. 1-21 may be found in, or implied by, any part of the specification.

In an embodiment, the moment of inertia is changed to slow down the turbine in high winds or other flow. In an embodiment, the changing of the centrifugal force as a result of the increasing and/or decreasing of the rotational velocity of the turbine shaft speed controls the activation (of the release) and deactivation (of the release or the engagement) of a clutch to a movable mass. In this way, some energy may be stored or released as rotational kinetic energy. In situations where the energy input is fixed (e.g., the fluid velocity is relatively constant) the displacement of the masses may be adjustably controlled to control speed of rotation of the shaft of the turbine.

A method to reset the adjustable flywheel may use a control arm from a controlled or centrifugal clutch or other mechanism. A one-way gear with a mechanical reset may control the hysteresis of the flywheel's effective rotational diameter and the flywheel's velocity.

The kinetic energy of a turbine is given by $$E_{rotation} = \frac{Iw^2}{2} = \frac{kmr^2w^2}{2},$$

where
  w is the angular velocity,
  I is the moment of inertia of the mass about the center of rotation (which may be referred to as the mass moment of inertia or angular mass), which is given by $I=k\,m\,r^2$, and where
  k is inertial constant (that depends on shape of the mass),
  m is the mass, and
  r is the perpendicular distance of the outer perimeter of the mass to the axis of rotation for objects having a center of mass located on the axis of rotation and is the perpendicular distance from the axis of to the center of mass for objects having a center of mass that is not on the axis of rotation.

The angular velocity is defined by $w=(d\Phi/dt)=(dx/dt)/r$, where
  $d\Phi$ is angular change of the position of the mass,
  dx is displacement of the mass in the direction of rotation,
  dt is change in time during which the change in angle $d\Phi$ or change in position dx occur. The velocity dx/dt is sometimes referred to as the tangential velocity of an element moving tangential to the direction of rotation. As an aside, the conversion factor between revolutions per minute and the angular velocity in radians per second is given by rpm=$w$60/($2\pi$)=9.55$w$.

It can be seen that, using the clutch, the effective radius r at which the extra masses rotate may be varied with or without increasing w, which may be used for controlling the speed of the rotational velocity and rotational kinetic energy of the turbine.

A hysteresis effect may be induced by a controlling clutch, which is triggered by the centrifugal forces of the rotating turbine and which, in turn, controls the displacement of masses, thereby changing the effective flywheel diameter causing the moment of inertia to change. The clutch may facilitate a low or limited amount of energy to accumulate as stored kinetic energy, which may be used to regulate the transfer of energy to a load.

The clutch gives some control over the conversion of energy from rotational energy to electrical energy. The clutch is a mechanical automatic control mechanisms for the turbine, which may improve turbine energy storage and energy transfer. The clutch also provides automatic mechanical hysteresis for improved energy storage and transfer. A centrifugal control of the flywheel displacement may be accomplished via the centrifugal clutch. In an embodiment, the masses may have an aerodynamic shape for lift assisted displacement with speed.

Included within the scope of this specification is a variable flywheel that is adjustable and/or controlled by centrifugal forces. The variable flywheel may include a simple mechanical flywheel that is rotationally balanced. The variable flywheel may include a simple mechanical hysteresis in which the displacement of the flywheel increases with rotational speed, which may include a one-way gear to maintain displacement until reset with a release trigger at some desired lower rotational speed. The variable flywheel may include a simple mechanical pilot variable flywheel (which may be smaller than another major flywheel) to control the On/Off levels of the displacement of a major flywheel. The assembly having the pilot and major flywheel may include a centrifugal clutch, a hysteresis mechanism, and/or a hysteresis release trigger. The variable flywheel may include a motor or other power control to control the displacement of the flywheel based on fluid conditions, stored energy, speed, or other criteria.

The specification also includes applications of the variable flywheel, such as for storing energy for a pulsed energy transfer. The pulsed energy transfer may include a low or constant power input during increasing displacements of the flywheel and/or during increasing speeds of rotation. The pulsed energy transfer may allow a low power motor or turbine, for example, to rev up the rotational velocity, via small displacements and/or with small amounts of resistance, storing the energy in small increments. Thereby incremental increase in velocity may allow for an overall greater displacement and greater amount of energy storage while the angular velocity is increasing, because turbine efficiency increases with higher velocity fluid flows until the velocity at which optimum efficiency is reached and turbines usually operate and below the velocity at which they achieve maximum efficiency. The applications of the variable flywheel and centrifugal clutch may include using the flywheel for variable storage of energy on a power turbine. The variable flywheel and/or centrifugal clutch change the angular velocity (and/or energy required) from mode of storing the input power flow (or maintaining the power stored)—while also producing power—to a mode of outputting or transferring the power stored. The applications may also include using a flywheel to control a clutch, transducer, and/or other mechanism by displacements of the flywheel due to centrifugal forces.

The specification also includes a centrifugal clutch, which may include a simple mechanical speed control method with a small pilot variable flywheel. The centrifugal clutch may include a mechanical method of controlling hysteresis. The centrifugal clutch may include a motor and/or other power control that is programmed to control the engagement of the clutch based on fluid conditions.

Turbine with Flywheel Assembly

Figure 1B:
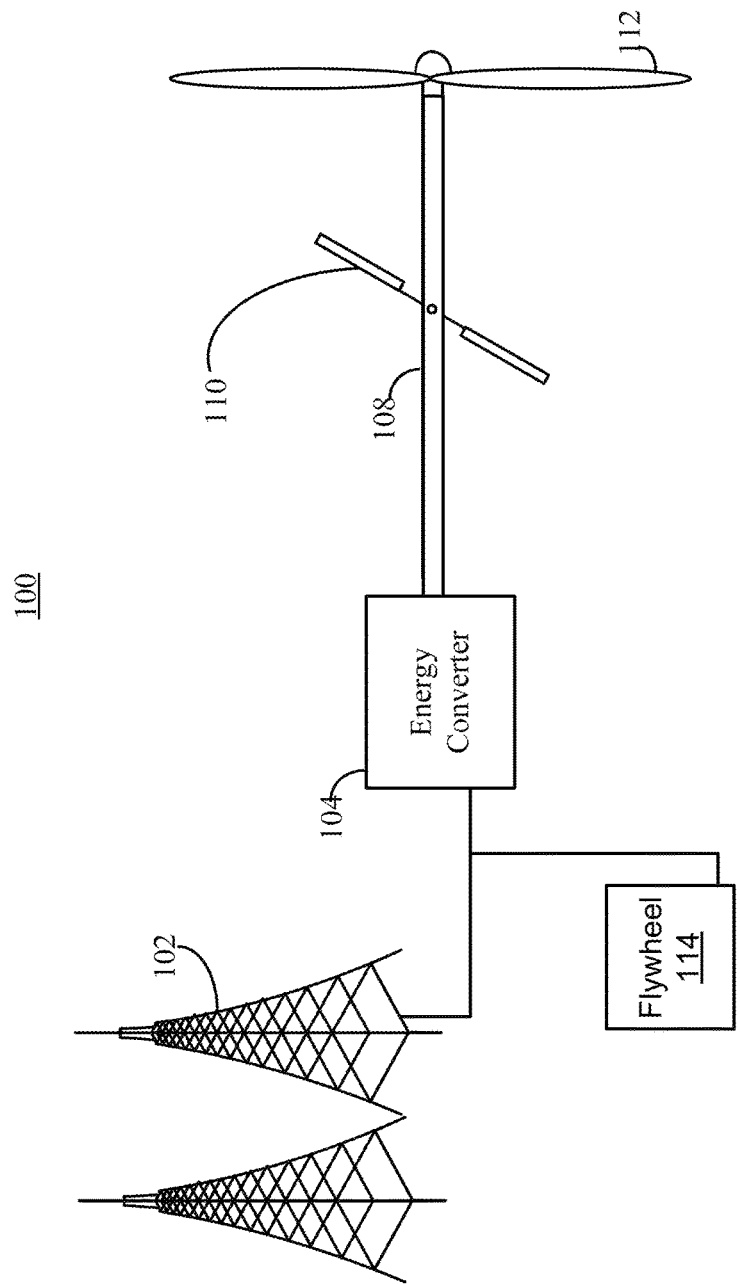
FIG. 1B shows a diagram of an embodiment of generator system having one or more flywheels.

FIG. 1 shows a diagram of an embodiment of generator system 100. Generator system 100 includes electrical load 102, converter 104, turbine shaft 108, flywheel 110, and blades 112. In other embodiments, pulsed energy transfer system 100 may not have all of the components listed above or may have other components instead of and/or in addition to those listed above.

Generator system 100 may convert the energy of the flow of a fluid (e.g., air, water, gas, or another fluid) into electrical energy. Generator system 100 may be capable of converting fluid flow into electricity in conditions where the flow rate of a fluid is too low for converting fluid flow into electricity without generator system 100, by pulsing (e.g., periodically engaging and disengaging) an energy converter so that the energy converter converts the energy only during certain periods of time, which may be brief in duration and may occur frequently in succession and may be continuous. In an embodiment, generator system 100 may store rotational energy at low-flow conditions while disconnected from an electrical load, and then be connected to transfer energy to an electrical load. In the specification, the term "low-flow" refers to conditions wherein the flow of moving fluid is insufficient for overcoming resistive force, such as static and kinetic friction, drag on the turbine blades, and resistive forces resulting from Lenz's law and from electrical load 102. Consequently, in such conditions the components are unable to generate usable energy efficiently or are unable to generate usable energy at all. Further, the term "hi-flow" refers to conditions wherein the flow of moving fluid is sufficient for overcoming the static friction and drag acting on the components, and in which the components are able to generating usable energy.

Electrical load 102 may represent a consumption of power associated with devices or structures that receive electrical energy from generator system 100. For example, electrical load 102 may be one or more electrical appliances, a series of batteries that receive and store energy for future use, a home wired to receive generated energy, or a portion of an electrical grid that transmits power to general consumers. Alternatively, the turbine may be connected to a mechanical load, such as a machine, mill, pump, waterwheel, saw, grinder, and/or elevator.

Energy converter 104 may convert mechanical energy into useful energy, such as electrical energy, and transfer the usable energy into work or in the case of electrical energy, the electrical energy may be transferred to electrical load 102. For example, energy converter 104 may be a generator, alternator, inverter, or combination thereof. In an embodiment, energy converter 104 may receive kinetic energy generated by the rotation of a fan, turbine, or other device capable of producing mechanical energy from the flow of moving fluids. Energy converter 104 may convert received energy into electrical energy, and transfer the electrical energy to electrical load 102. Alternatively, a mechanical load, such as mill or water pump, may replace energy converter 104.

Turbine shaft 108 may receive and transfer rotational energy. In an embodiment, a fluid causes the blades to turn, which causes turbine shaft 108 to turn. Flywheel 110 extends away from or moves inward toward turbine shaft 108, thereby increasing or decreasing the moment of inertia of the turbine shaft 108 regulating the rotational velocity of turbine shaft 108, which in turn regulates the power output of energy converter 104 or the energy transmitted to a mechanical load.

Figure 2:
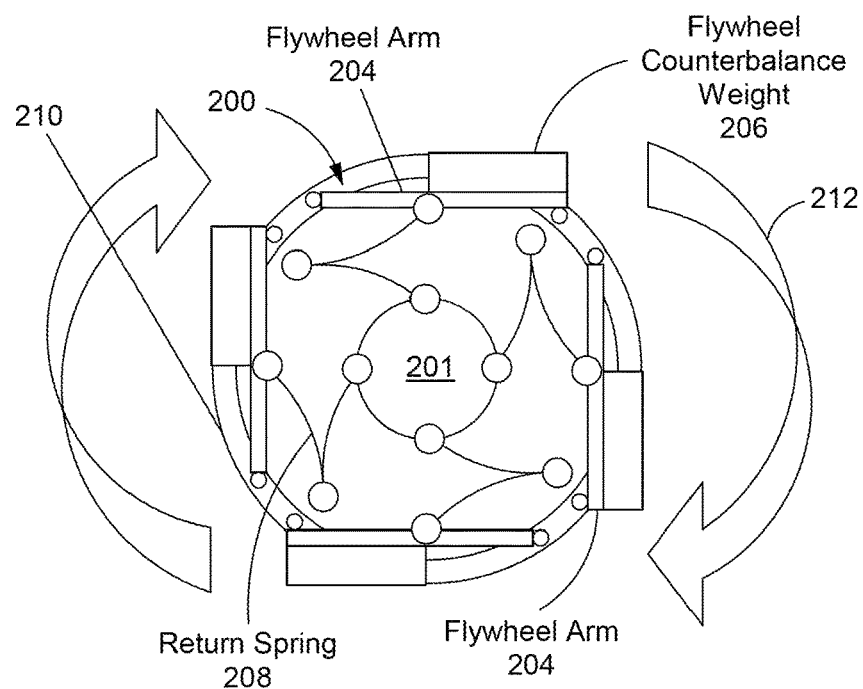
FIGS. 2 and 3 show cross sections of an assembly that may be used in the generator systems of FIG. 1 having an embodiment of a turbine shaft having a flywheel.
Figure 3:
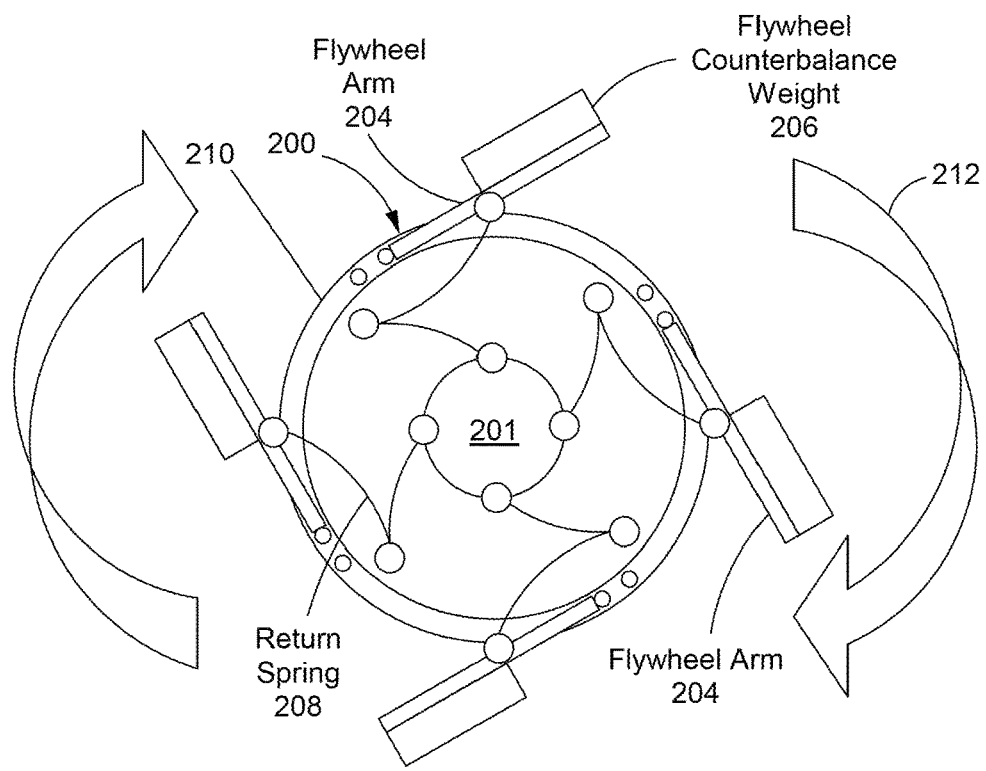

Blades 112 may receive the flow of a moving fluid (e.g., air, water, gas) to generate mechanical energy. In an embodiment, blades 112 may be any of a plurality of bladed devices capable of utilizing the kinetic energy of a moving fluid.
Perpendicular Flywheel FIGS. 2 and 3 show cross sections of an assembly having an embodiment of turbine shaft 200 having a flywheel, which may be used for the combination of turbine shaft 108 and flywheel 110. FIGS. 2 and 3 include turbine shaft 200, which may include core 201, flywheel arms 204, weights 206 (which may be referred to as counter balance weights), return springs 208, and shaft shell 210. FIGS. 2 and 3 also show directional arrows 212. In other embodiments, the assembly of FIGS. 2 and 3 may not have all of the components listed above or may have other components instead of and/or in addition to those listed above.

Turbine shaft 200 is turned by fluid flowing passed the blades (not shown in FIG. 2) connected to the shaft, such as blades 112 (FIG. 1). Core 201 supports the springs that pull the flywheel arms inward. Core 201 is rigidly attached to the outer shell of turbine shaft 200.

Flywheel arms 204 are pivotally attached to the outer shell of turbine shaft 200 (e.g., via pins or hinges), so that as turbine shaft 200 rotates the centrifugal force tends to push flywheel arms 204 outwards. Weights 206 are masses that increase the moment of inertia of turbine shaft 200. Weights 206 are located towards the ends of flywheel arms 204, so that as flywheel arms 204 extend counter balance weights are displaced further away from turbine shaft 200 causing a greater increase in the moment of inertia of turbine shaft 200 than were weights 206 not present or were the weights 206 further from the outer ends of flywheel arms 204 (which is attached to turbine shaft 200).

Return springs 208 are each attached to core 201 and flywheel arms 204. Return springs 208 pulls flywheel arms 204 toward core 201, thereby pulling flywheel arms 204 toward turbine shaft 200.

Shaft shell 210 is the outer shell of the turbine shaft 200. Flywheel arms 204 are mounted to shaft shell 210. Core 201 is rigidly attached to shaft shell 210, such that shaft shell 210 is concentric to core 201.

Arrows 212 show the direction of rotation of turbine shaft 200. The relative size of arrows 212 is indicative of the relative angular velocity of turbine shaft 200. In FIG. 1, arrows 212 are smaller than in FIG. 2, which indicates that turbine 100 rotates slower in FIG. 1 than in FIG. 2. In FIG. 1, turbine shaft 200 rotates at a slow enough angular velocity so that the centrifugal force pulling flywheel arms 204 outward is not large enough to overcome the inward force of return spring 208, and pull flywheel arms 204 off of turbine shaft 200 against the inward pull of return springs 208. In contrast in FIG. 2, turbine shaft 200 is spinning fast enough so that flywheel arms 204 are pulled off turbine shaft 200 despite the inward pull of return springs 208. More accurately, as a result of the angular velocity of the flywheel shaft in FIG. 2, the extended position of flywheel arm 102 is the point of equilibrium at which the centrifugal force on flywheel arms 204 is equal to the inward force of return springs 208 (in FIG. 2 the extended position of flywheel 204 is the position in which the flywheel arms 204 extend off turbine shaft 200).

Figure 4:
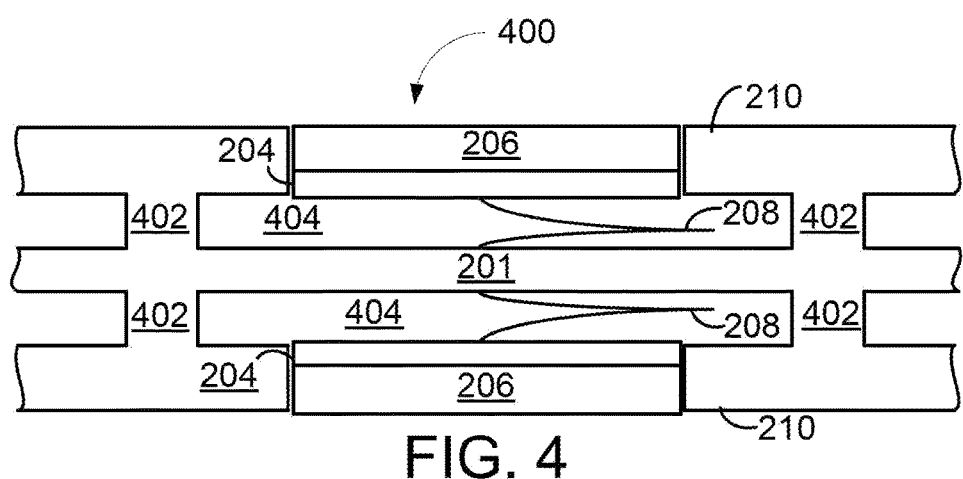
FIG. 4 shows a cross section along the length of a portion of the turbine shaft of FIGS. 2 and 3 that may be used in the generator systems of FIG. 1.

FIG. 4 shows a cross section 400 along the length of a portion of turbine shaft 200. FIG. 4 shows core 201, flywheel arms 204, weights 206, return spring 208, shaft shell 210, posts 402, and cavity 404. In other embodiments, cross section 400 may not have all of the components listed above or may have other components instead of and/or in addition to those listed above.

Core 201, flywheel arms 204, weights 206; return spring 208, and shaft shell 210 were discussed in conjunction with FIGS. 2 and 3, above. Posts 402 rigidly attach core 201 to shaft shell 210, so that core 201 can support springs 208. Cavity 404 is the space within shaft shell 210 where core 201 and posts 402 are located.

Figure 5:
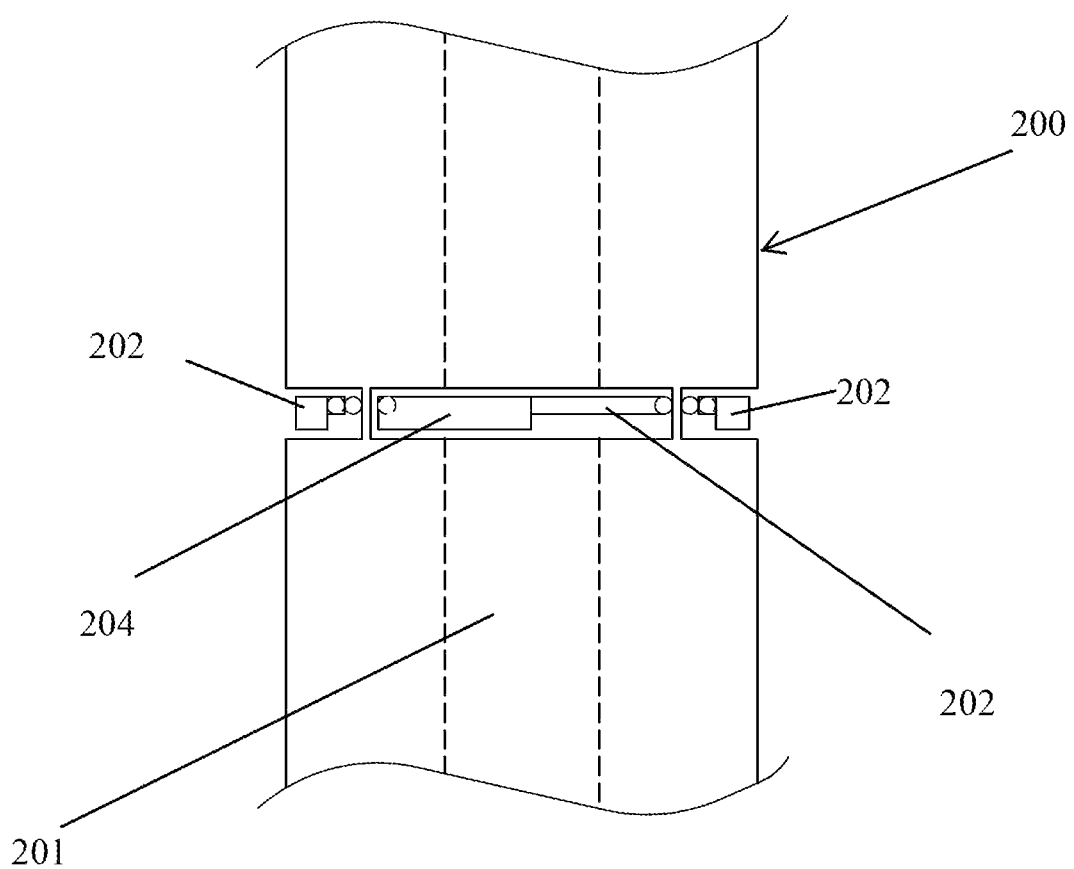
FIG. 5 shows a top view of an embodiment of a portion of turbine shaft of FIGS. 2 and 3.

FIG. 5 shows a perspective view of an embodiment of a portion of turbine shaft 200. FIG. 5 shows turbine shaft 200, which may include core 201, flywheel arms 204, weights 206, and shaft shell 210. In other embodiments, the portion of turbine shaft of FIG. 5 may not have all of the components listed above or may have other components instead of and/or in addition to those listed above.

The perspective view of FIG. 5 clarifies some of the structural and functional details an embodiment of turbine shaft 200, which may include core 201, flywheel arms 204, weights 206, and shaft shell 210. FIG. 5 also clarifies aspects of the manner in which an embodiment of turbine shaft 200, which may include core 201, flywheel arms 204, weights 206, and shaft shell 210 interact with one another. Core 201 is illustrated in phantom, because core 201 is hidden from view.

An Assembly in which One Flywheel Controls Another

Figure 6:
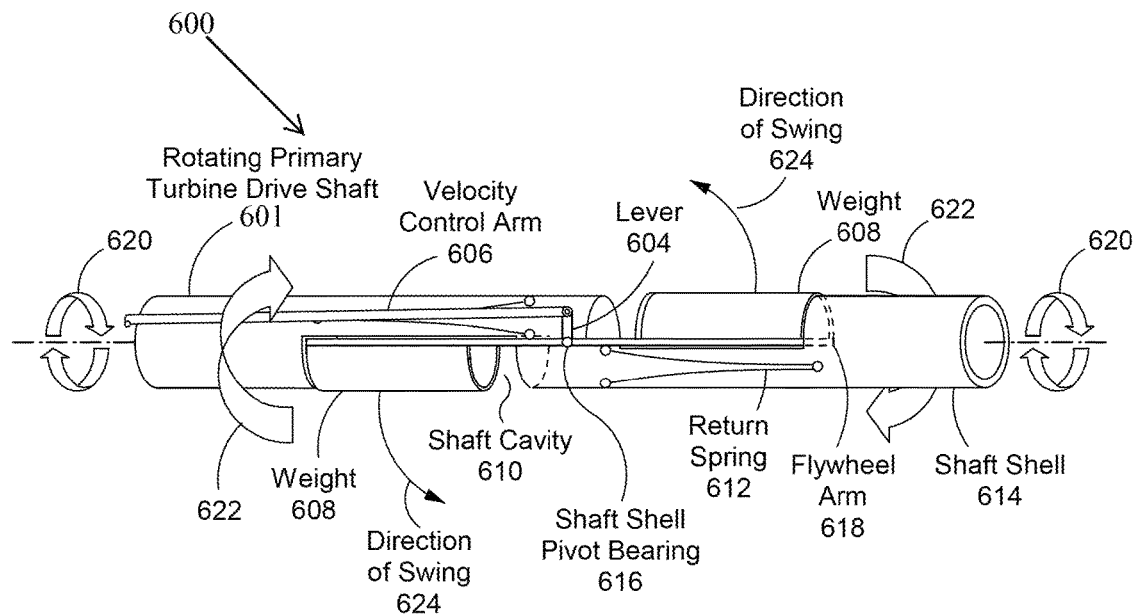
FIGS. 6 and 7 show an embodiment of a portion of turbine that may be used in the generator systems of FIG. 1.
Figure 7:
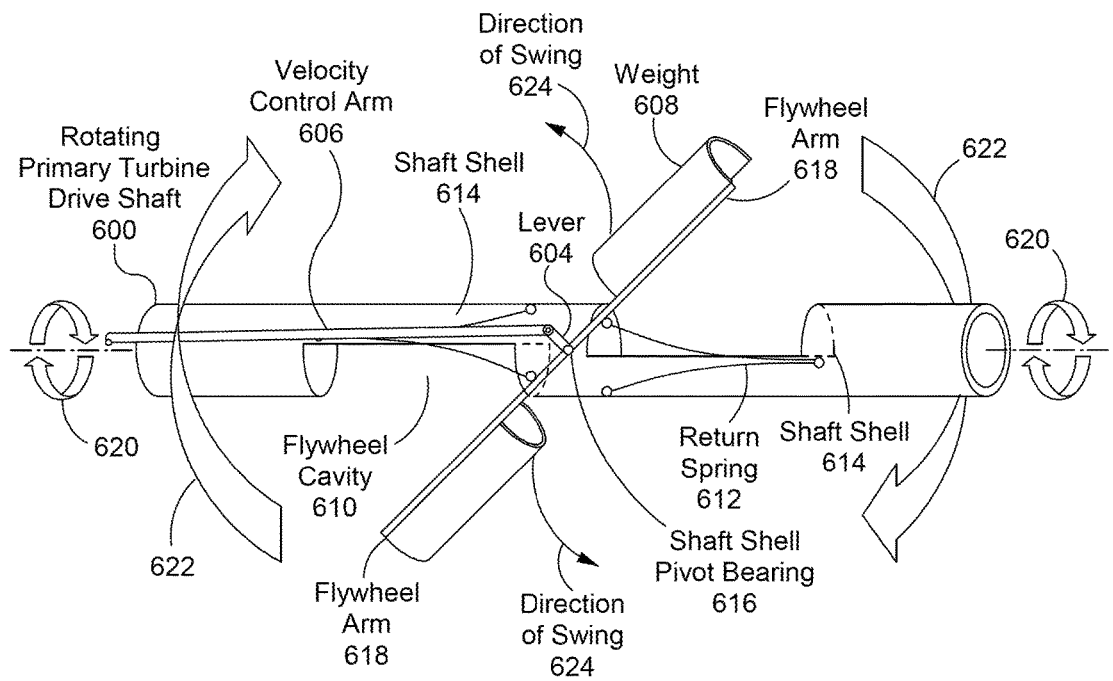
Figure 10:
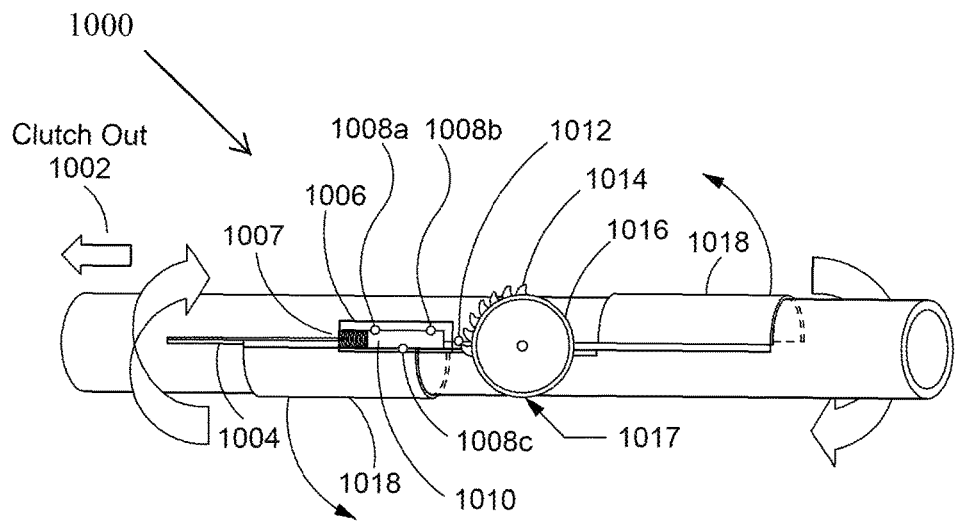
FIGS. 10 and 11A show a portion of a turbine shaft assembly with another embodiment of a flywheel that may be controlled by the clutch control of FIGS. 8 and 9.
Figure 11A:
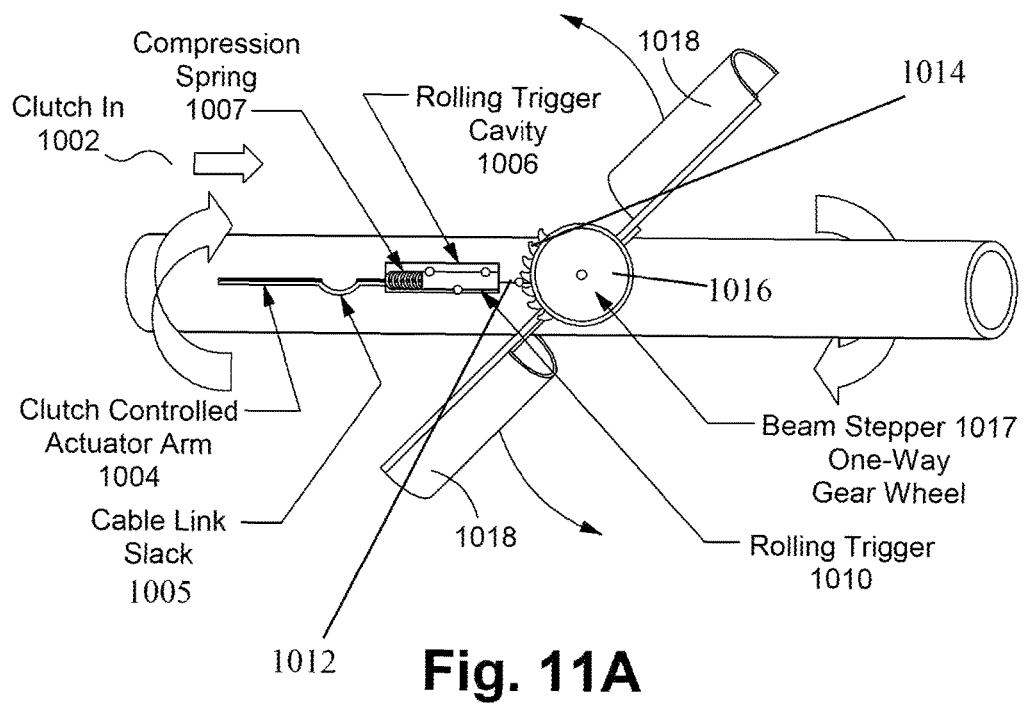

FIGS. 6 and 7 show a flywheel mechanism that is connected to a clutch that is shown in FIGS. 8 and 9, which in turn is connected to another flywheel shown in FIGS. 10 and 11A, among other things. The flywheel in FIGS. 6 and 7, via the clutch of FIGS. 8 and 9, controls the flywheel in FIGS. 10 and 11A. In the paragraphs below, each of FIGS. 6-11B are discussed in their numerical order, and consequently first the flywheel of FIGS. 6 and 7 is discussed, next the clutch of FIGS. 7 and 8 are discussed, and then the flywheel of FIGS. 10 and 11A is discussed. The function of the entire assembly is discussed in FIG. 11B. After discussing FIGS. 6-11B in their numerical order the manner in which the two flywheels and the clutch will be discussed. Alternatively, the flywheel of FIGS. 6 and 7 could be used by itself or as part of a dual flywheel system, such as the dual flywheel system of FIG. 16A, without the velocity clutch. The embodiment of FIGS. 2-5 is different than the embodiment of FIGS. 6-11B, and the differences will be discussed in conjunction with FIGS. 6 and 7, below.

Control Flywheel

FIGS. 6 and 7 show an embodiment of a portion of turbine 600. Turbine 600 may include turbine shaft 601 having first flywheel 602, which may include lever 604, velocity control arm 606, weights 608, shaft cavity 610, return spring 612, shell shaft 614, pivot bearing 616, flywheel arm 618, arrows 620, arrows 622, and direction of swing 624. In other embodiments, the portion of turbine shaft 601 of FIGS. 6 and 7 may not have all of the components listed above or may have other components instead of and/or in addition to those listed above.

Turbine shaft 601, weights 608, return spring 612, shaft shell 614, flywheel arms 618, and arrows 622 are similar to turbine shaft 200, weights 206, shaft shell 210, flywheel arms 204, and arrows 212, respectively, which were described above in conjunction with FIGS. 2 and 3 (arrows 212, 620, and 622 may be referred to as arrows of rotation). However, flywheel arms 618 lie in a direction that is parallel to the direction of turbine shaft 601, while in contrast flywheel arms 204 are perpendicular to turbine shaft 200.

Lever 604 is perpendicular to, and moves with, the flywheel arm 618. In an embodiment, shaft cavity 610 supports one end of return springs 612. Return spring 610 pulls on shaft sell 614 while pulling flywheel arm 618 inwards, thereby pulling flywheel arm 618 towards shaft shell 614 and therefore towards shaft 601. In an embodiment, return spring 612 is attached to the exterior of shaft 601. In another embodiment, return spring 612 is mounted to the interior side of shaft shell 614, and return spring 601 is located within shaft cavity 610.

Velocity control arm 606 moves back and forth in response to the motion flywheel arms 618. As flywheel arm 618 rotates, level 604 rotates with flywheel 618, which pushes velocity control arm 606 backwards or forwards (depending the direction of swing of the flywheel arms 618). When one of flywheel arms 618 moves upward, the corresponding one of velocity control arms 606 moves to the left in FIGS. 6 and 7, and when one of flywheel arms 618 moves downward, the corresponding one of velocity control arms 618 moves to the right in FIGS. 6 and 7. Velocity control arms 606 will be discussed further below in FIGS. 8 and 10. Pivot bearing 616 is the bearing upon which flywheel arm 618 pivots. Another pivot bearing may "pivotably" connect lever 604 to velocity control arms 606 (that is, the pivot bearing is connected to level 604 in a manner such that the pivot bearing is capable of pivoting or rotating). The words, "pivotably" and "pivotally" may be interchanged for one another anywhere in the specification.

The comparison between FIGS. 6 and 7 is similar to that of the comparison between FIGS. 2 and 3. Specifically, in FIG. 6, arrows 622 are smaller than in FIG. 7, which indicates that turbine 600 rotates slower in FIG. 6 than in FIG. 7. In FIG. 6, turbine shaft 601 rotates at slow enough angular velocity so that the centrifugal force pulling flywheel arms 618 outward is not large enough to overcome the inward force of return spring 612, and pull flywheel arms 618 off of turbine shaft 601 against the inward pull of return springs 612. In contrast in FIG. 7, turbine shaft 601 is spinning fast enough so that flywheel arms 618 are pulled off turbine shaft 601 despite the inward pull of return springs 612. More accurately, as a result of the angular velocity of the flywheel shaft in FIG. 7, the extended position of flywheel arm 618 (in FIG. 7 in which the flywheel arms 618 extend off turbine shaft 601) is the point of equilibrium at which the centrifugal force on flywheel arms 618 is equal to the inward force of return springs 612.

In the embodiment illustrated in FIGS. 6 and 7, lever 604, velocity control arm 606, weights 608, shaft cavity 610, return spring 612, shell shaft 614, pivot bearing 616, and flywheel arm 618 are located exterior to shaft 601, and cavity 610 is optional (because in this embodiment cavity 610 is not necessary for holding any of the lever 604, velocity control arm 606, weights 608, shaft cavity 610, return spring 612, shell shaft 614, pivot bearing 616, and flywheel arm 618, which may be located exterior to shaft 601 and cavity 610). In another embodiment, return spring 612 is located within cavity 610. In another embodiment, pivot bearing 616, lever 604, and velocity control arms 618 are located within cavity 610 in addition to, or instead of, return spring 612. Similarly, flywheel arms 618 may be located on the exterior or the interior of shaft 601. In an embodiment, lever 604 and velocity control arm 606 are not present, and the flywheel assembly of FIGS. 6 and 7 functions independently of any other flywheels (if there are any).

Arrows 620 (similar to arrows 622) show the direction of rotation of turbine shaft 601, but (in contrast to arrows 622) the size of arrows 620 does not indicate anything. Direction of swing 624 shows the direction in which flywheel arm 618 swings outwards while the rotational velocity increases.

Clutch Control

FIGS. 8 and 9 show an embodiment of a clutch control 800. FIG. 8 shows arrow 802, clutch control 800, which includes clutch control arm 802, two-position level 804, cam 806, level 808, spring 810, and velocity control arm 812. FIG. 8 also shows arrows 814 and 816. In other embodiments, clutch control 800 may not have all of the components listed above or may have other components instead of and/or in addition to those listed above.

Clutch control arm 802 causes a clutch to be released or engaged. When clutch control arm 802 is moved to the left in FIG. 8, the clutch is engaged and when clutch control arm moves to the right in FIG. 8 the clutch is released.

Two-position lever 804 is a lever that has two stable positions. Two-position lever 804 in connected to, and moves, clutch control arm 802 to the left and the right engaging and releasing the clutch. In an embodiment, two-position lever 804 has two lobes that protrude from one end. In an embodiment, a portion between the two lobes that connects the two lobes is straight, and between the two lobes another lever may be placed to push against the one of the two lobes.

Cam 806 rests against two-position lever 804. When cam 806 is moved, cam 806 pushes two-portion lever 804 from one position to the other stable position of two-position lever 804.

Lever 808 holds cam 806 at one end of lever 808. Lever 808 is pivotally mounted, and as lever 808 pivots cam 806 is moved from a first position to a second position (which in turn pushes two-position lever 804 from a first position to a second position).

Spring 810 pulls a bottom portion of two-position lever 804 upward. As a result, initially, two-position level 804 is held in a first position by spring 810 pulling upward on the bottom portion of two-position lever 804, which pushes first a lobe of two-position lever 804 into a first side of cam 806. When cam 806 is moved, cam 806 pushes the first lobe of two-position lever 804 away from the first side of cam 806 against the pull of spring 810, which causes spring 810 to stretch. In an embodiment, spring 810 is stretched the furthest when two-position lever 804 is symmetrically positioned with respect to spring 810, over the center of two-position lever 804, having half or two-position lever 804 on one side of spring 810 and half of two-position spring on the other side of two-position lever 804 and when spring 810 covers the pivot that supports two-position lever 804. In other words, the center position between the two positions is the point where the spring is over the center, and the two-position lever switches positions between two stable positions, which creates hysteresis. Once cam 806 pushes two-position lever 804 past the middle of two-position lever 804, the upward pull of spring 810 pushes the second lobe of two-position lever 804 into the second side of cam 806, so that now spring 810 holds two-position lever 804 in the second position in which the second lobe of two-position lever rests on the second side of cam 804.

Velocity control arm 812 may be the other part of velocity control arm 606 (in which case FIG. 8 shows one end of the velocity control arm and FIG. 6 shows the other end). Velocity arm 812 pulls or pushes the top of lever 808 to the left or right in FIG. 8 as velocity arm moves towards the left or right of FIG. 8. The movement of velocity arm 812 causes two-position lever 804 two toggle between the two stable positions of two-position lever 804.

Arrow 814 shows the direction of movement of velocity arm 812, and arrow 816 shows the direction of movement of clutch control arm 802. Arrows 814 and 816 point in the same direction, because velocity arm 812 and clutch control arm 802 move in the same direction.

FIG. 8 differs from FIG. 9 in that FIG. 8 shows the state of clutch during low velocity flow. When flywheel arm 618 (FGs. 6 and 7) falls to a position parallel to shaft 601 (as shown in FIG. 6), velocity control arm 612 moves in the direction that arrows 814 and 816 are pointed in FIG. 8. FIG. 9 shows the state of clutch during high velocity flow. When flywheel arm 618 (FGs. 6 and 7) rises, as shown in FIG. 7, velocity control arm 612 moves in the direction that arrows 814 and 816 are pointed in FIG. 9.

The assembly of FIGS. 8 and 9 has two stable equilibrium states, and the assembly tends to switch or toggle between those states, which creates a hysteresis in the behavior of the assembly of FIGS. 8 and 9.

Flywheel with Clutch

FIGS. 10 and 11A show a portion of a turbine shaft assembly 1000 with another embodiment of a flywheel. FIGS. 10 and 11A include arrow 1002, clutch control arm 1004, cable link 1006, compression spring 1007, rollers 1008a-c, trigger cavity 1010, rolling trigger 1012, pin 1014, teeth 1015, disc 1016, gear 1018, and flywheel 1018. In other embodiments, the portion of turbine shaft assembly 1000 of FIGS. 10 and 11A may not have all of the components listed above or may have other components instead of and/or in addition to those listed above.

Arrow 1002 shows the direction of movement of a clutch control arm. Arrow 1002 faces in a different direction in FIGS. 10 and 11A to indicate that the clutch control arm moves in a different direction in FIGS. 10 and 11A. Clutch control arm 1004 may be the other end of clutch control arm 802 (FIG. 8), which moves in the same direction as velocity control arm 606 (FIG. 6). However, in order for clutch control arm 1006 to be the same as clutch control arm 802 the components of FIGS. 10 and 11A need to be arranged to form the mirror image of the assembly drawn in FIGS. 10 and 11A, or the components of FIGS. 6-9 need to be arranged to form the mirror image of the assembly drawn in FIGS. 6-9.

Cable link 1006 is a flexible link to clutch control arm 1002. When clutch control arm 1002 moves towards the flywheel of FIGS. 10 and 11A, cable link 1006 becomes slack and may sag (as shown in FIG. 10). When clutch control arm 1002 moves away from the flywheel of FIGS. 10 and 11A, cable link 1006 becomes taut (as shown in FIG. 11).

Compression spring 1007 pushes a pin towards the flywheel of FIGS. 10 and 11A. Rollers 1008a-c allow a trigger to roll back and forth. Rolling trigger 1010 rolls on rollers 1008a-c. Rolling trigger 1010 is pushed towards the flywheel of FIGS. 10 and 11A by compression spring 1007, and is connected to cable link 1006 (e.g., cable link 1006 may connect directly to rolling trigger 1010 or may connect to rolling trigger 1010 via pin that always stick out of the trigger housing). When cable link 1006 is pulled away from the flywheel of FIGS. 10 and 11A, cable link pulls rolling trigger 1010 against the force of compression spring 1007. Rolling trigger cavity 1012 may be the rolling trigger housing that houses rolling trigger 1010 and compression spring 1007. Rolling trigger 1010 rolls within rolling trigger housing 1012, via rollers 1008a-c. Compression spring 1007 pushes rolling trigger 1010 by pushing on rolling trigger cavity 1012.

Pin 1014 is attached to rolling trigger 1010 and moves with rolling trigger 1010. Teeth 1015 are teeth of a gear. In and embodiment teeth 1015 are not symmetric, but are shaped when pin 1014 are stuck into teeth 1015, the gear to which teeth 1015 is prevented from moving in one direction, but is allowed to move in the other direction. In an embodiment, teeth 1015 have one side that is parallel to the radius of the gear and one side that is sloped with respect to the radius of the gear so as to slide past pin 1014. Disc 1016 is a disc to which teeth 1015 are attached. Gear 1017 is the gear that is made up by teeth 1015 and disc 1016. Pin 1014 is optional and stops gear 1017 from returning to its low velocity state in which Flywheel 1018 hugs the shaft of the turbine. Flywheel 1018 tends to rotate outwards as the shaft rotates faster. Despite pin 1014 being engaged in teeth 1015, as a result of the slopes on teeth 1015, pin 1014 slides or ratchets past teeth 1015 as flywheel 1018 swings outward. When turbine shaft 601 rotates fast enough, the flywheel of FIG. 6 pulls on the velocity control arm 606 (FIG. 6), which in turn causes the assembly of FIGS. 8 and 9 to pull on clutch control arm 802 (FIGS. 8 and 9) or 1002 (FIGS. 10 and 11A), which pulls on cable link 1006, which pulls rolling trigger 1010 against compression spring 1007, and which in turn pulls pin 1014 out of teeth 1015, allowing flywheel 1018 to return to its low velocity position.

Total Assembly

Figure 11B:
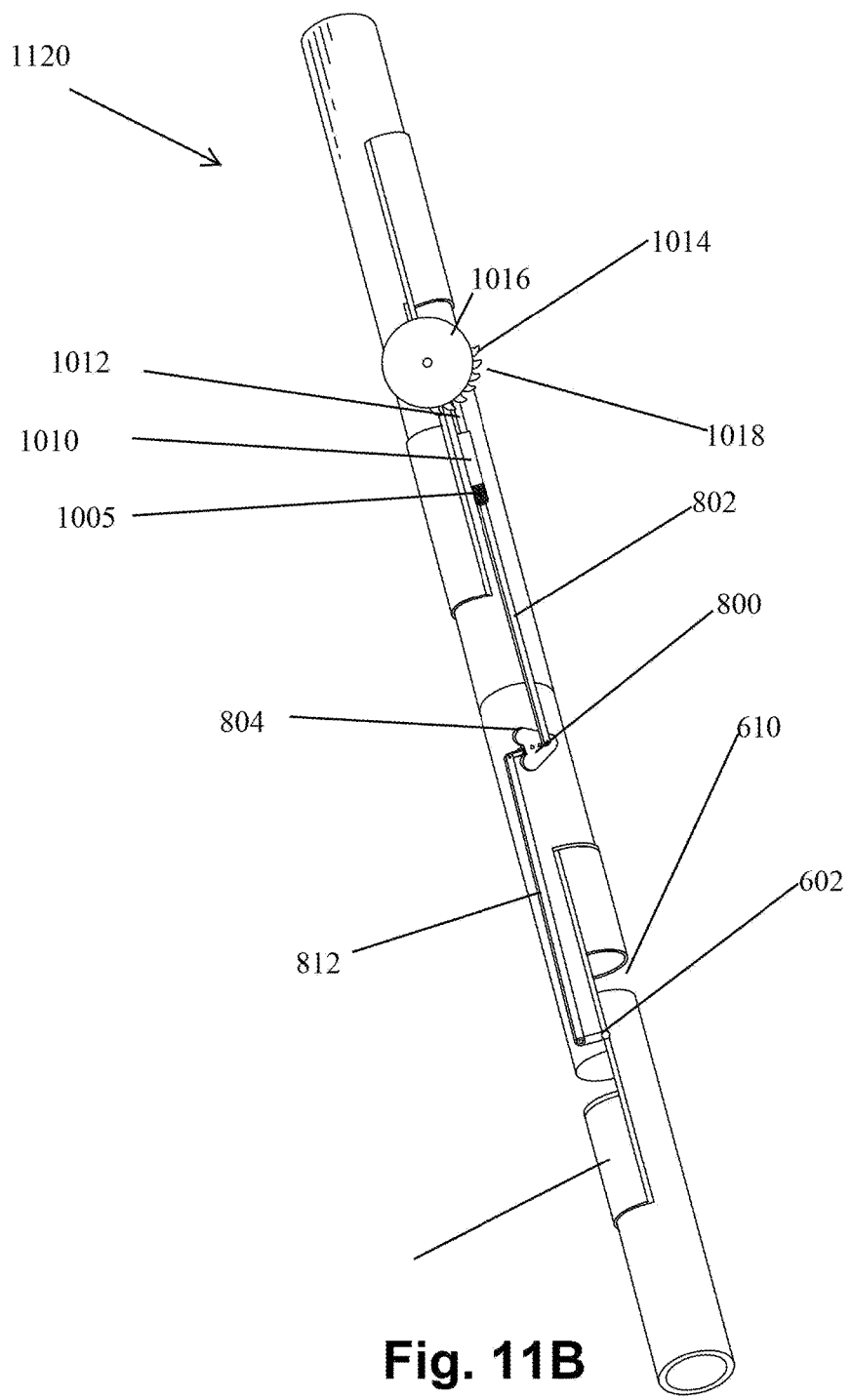
FIG. 11B shows the combination of flywheel of FIGS. 6 and 7 connected to control the clutch control of FIGS. 8 and 9, which in turn is connected to control the flywheel of FIGS. 10 and 11A.

FIG. 11B shows a flywheel assembly 1120, which includes turbine shaft 601, first flywheel 602, weights 608, shaft cavity 610, flywheel arm 618, (FIGS. 6 and 7), clutch control 800, clutch control arm 802, two-position level 804, velocity control arm 812 (FIGS. 8 and 9), and turbine shaft assembly 1000, clutch control arm 1004, rolling trigger 1012, teeth 1015, disc 1016, gear 1018, and flywheel 1018 (FIGS. 10 and 11A), which were discussed above.

First flywheel 602 triggers clutch control 800 to change states, and clutch control 800 controls flywheel 1018 of turbine shaft assembly 1000. When turbine shaft 601 rotates fast enough, flywheel 602 (of FIG. 6) pulls on the velocity control arm 606 (FIG. 6), which in turn causes the assembly of FIGS. 8 and 9 to pull on clutch control arm 802 (FIGS. 8 and 9) or 1002 (FIGS. 10 and 11A), which pulls on cable link 1006, which pulls rolling trigger 1010 against compression spring 1007, and which in turn pulls pin 1014 out of teeth 1015, allowing flywheel 1018 to return to its low velocity position. In an embodiment, flywheel 602 is smaller than flywheel 1018, so that although flywheel 602 controls flywheel 1018, the dominant shift in the moment of inertia is due to flywheel 1018.

Figure 11C:
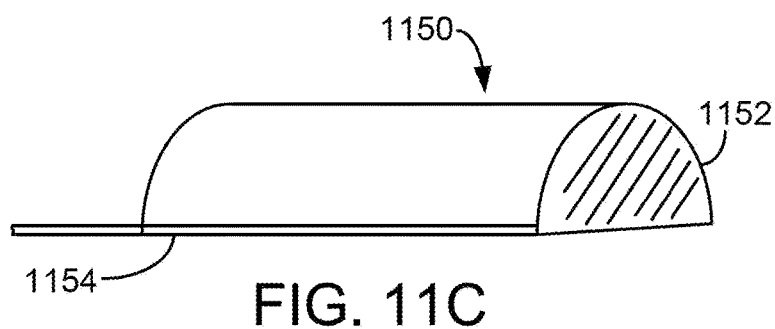
FIG. 11C shows a representation of an embodiment of a portion of the flywheel

FIG. 11C shows a representation of an embodiment of a portion of the flywheel 1150 having weight 1152 and flywheel arm 1154. In other embodiments, flywheel 1150 may not have all of the components listed above or may have other components instead of and/or in addition to those listed above.

Flywheel arm 1154 supports weight 1152. Weight 1152 may be solid. Flywheel arm 1154 differs from flywheel arm 1018 in that weight 1152 is a solid piece of material that is shaped like a section of a cylinder. The surface of weight 1152 may have the same shape as the surface of shaft 601.

Figure 11D:
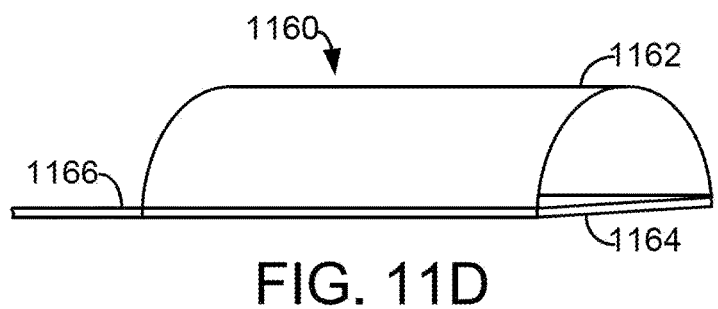
FIG. 11D shows a representation of another embodiment of a portion of the flywheel.

FIG. 11D shows a representation of another embodiment of a portion of the flywheel 1160, which has weight 1162, plate 1164, and flywheel arm 1166. In other embodiments, flywheel 1160 may not have all of the components listed above or may have other components instead of and/or in addition to those listed above.

Flywheel arm 1166 supports weight 1162 having plate 1164. Flywheel arm 1166 is similar to flywheel arm 1018 in that weight 1162 and weight 1162 are shaped such that weight 1162 has the same shape as the surface of shaft 601. However, weight 1162 also includes a plate 1164 for extra weight. Any of the flywheels in this specification may use the flywheels of FIGS. 11C and 11D or the flywheels illustrated in FIGS. 6, 7, 9, and/or 10 with or without a cavity in the shaft.

Graphs

FIG. 12 shows a graph 1200 of the angular rotation as a function of time. Graph 1200 has displacement axis 1202, time axis 1204, energy axis 1206, maximum displacement mark 1208, minimum displacement mark 1210 and plot 1212. In other embodiments, the system associated with graph 1200 may not have all of the features listed above or may have other features instead of and/or in addition to those listed above.

Graph 1200 is a graph of the angular velocity of turbine shaft 601 as a result of a particular fluid flow. Displacement axis 1202 is the axis that represents the displacement of the flywheel from turbine shaft 601, which may be in units of revolutions per minute. Higher positions on displacement axis 1202 represent larger displacements of flywheel arms 618 for turbine shaft 601. Time axis 1204 is used to measure time. Points further to the right along axis 1204 are later in time. Energy axis 1206 represents different amounts of energy stored in the rotation of the shaft of the turbine. Higher up on energy axis 1206 represent higher amounts of energy stored. The energy stored is the kinetic energy of turbine 600. Maximum displacement mark 1208 indicates the location on angular velocity axis 1202 that corresponds to the maximum velocity angular velocity reached by the turbine shaft 601, and minimum displacement mark 1210 indicates the location on displacement axis 1202 that corresponds to the maximum displacement possible of flywheel arm 618 from turbine shaft 601. Plot 1212 is the series of points that are defined by a pair of numbers in which one of the numbers of the pair is a displacement and the other number of the pair is time. Plot 1212 represents the displacement of flywheel arm 618 that results from a fluid flow having a kinetic energy that is proportional to plot 1212.

FIG. 13 shows graph 1300, which plots when the clutch is connected and disconnected. Graph 1300 may include time axis 1204, disconnected regions 1302, and connected regions 1304. In other embodiments, the system associated with graph 1300 may not have all of the features listed above or may have other features instead of and/or in addition to those listed above.

Time axis 1204 was discussed in FIG. 12 above. Graph 1300 is a graph of when the clutch of FIGS. 8 and 9 are connected and disconnected, disconnected region 1302, and connected region 1304. Graphs 1200 and 1300 are lined up so that the time axes of both graphs are lined up and so that points that are horizontally above one another represent the same value of time. As illustrated in FIG. 13, the displacement of flywheel arm 618 reaching the maximum value triggers the clutch to connect, and the minimum displacement of flywheel arm 618 triggers the clutch to disconnect.

FIG. 14 shows graph 1400, which plots when the turbine of FIGS. 10 and 11A charges and discharges. Graph 1400 may include time axis 1204, load region 1402, and discharge region 1404. In other embodiments, the system associated with graph 1400 may not have all of the features listed above or may have other features instead of and/or in addition to those listed above.

Time axis 1204 was discussed in FIG. 12 above. Graph 1400 is a graph of when the turbine of FIGS. 10 and 11A charge and discharge in disconnected region 1302 and connected region 1304, respectively. Graphs 1200 and 1400 are lined up, so that the time axis of both graphs are lined up, and so that points that are horizontally above one another represent the same value of time. As illustrated in FIG. 14, when the angular velocity of turbine 600 reaches the maximum value, the reaching of the maximum velocity, triggers the clutch (of FIGS. 8 and 9) to connect, which in turn causes the turbine to charge and the minimum velocity triggers the clutch to disconnect, which in turn causes the turbine to discharge.

FIG. 15 shows graph 1500, which plots when the turbine of FIGS. 10 and 11A stores and dissipates energy. Graph 1500 may include displacement axis 1202, time axis 1204, energy axis 1206, plot 121, angular velocity axis 1502, and plot 1504. In other embodiments, the system associated with graph 1500 may not have all of the features listed above or may have other features instead of and/or in addition to those listed above.

Displacement axis 1202, time axis 1204, energy axis 1206 were discussed in FIG. 12 above. Graph 1500 is a graph of when the turbine of FIGS. 10 and 11A charge and discharge. Angular velocity axis 1502 indicates the angular velocity of turbine shaft 601. Points higher up on angular velocity axis 1502 represent higher values of angular velocity. Plot 1504 is a plot of the storage and dissipation of energy of the turbine. Plot 1504 and 1212 are superimposed to illustrate the relationship between the control flywheel when the clutch and flywheel control are not attached to the when the clutch and control flywheel are attached. The superimposing of the plots 1504 and 1212 also illustrates the relationship between the control flywheel (FIGS. 6 and 7) to the storage of energy and the flywheel being controller (FIGS. 10 and 11A). As can be seen by comparing plots 1504 and 1212, as the rotational velocity increases, initially, the storage of energy, the displacement of both flywheels and the angular velocity increase. The increase in displacement of the control flywheel or of a flywheel without hysteresis starts may lag the increase of displacement of the flywheel being controlled, because flywheel being controlled needs to work against the ratcheting mechanism. Similarly, the displacement of the flywheel being controlled may increase in a series of small steps as a result of the ratcheting instead of increasing smoothly and linearly.

Prior to the control flywheel reaching its maximum displacement, the ratcheting system prevents the moment of inertia from decreasing, and the energy stored will not decrease as long as the fluid flow does not decrease. As the displacement of the flywheel being controlled increase, the displacement is not allowed to decrease until the rotational velocity decreases below a threshold level, at which time the displacement of the flywheel being controlled has a sudden drop in the displacement. As shown by the sharp drop in the displacement plotted by plot 1504. The threshold level of rotational velocity may be when turbine shaft 601 completely stops rotating or may be when turbine shaft 601 is rotating relatively slowly, as illustrated by plot 1504.

Although FIGS. 6 and 7 have a cavity in which the weights may be stored and FIGS. 10 and 11 have weights that hug turbine shaft 601 rather than being located within the cavity, the choice of depicting the assembly of FIGS. 6 and 7 as having a cavity of the assembly of FIGS. 10 and 11 not having a cavity, was just to illustrate both types of embodiments, either of the assemblies of FIGS. 6 and 7 and FIGS. 10 and 11 could have cavities in turbine shaft 601 and/or have weights that hug turbine shaft 601 in locations on turbine shaft 601 that do not have cavities.

Dual Flywheels

Figure 16A:
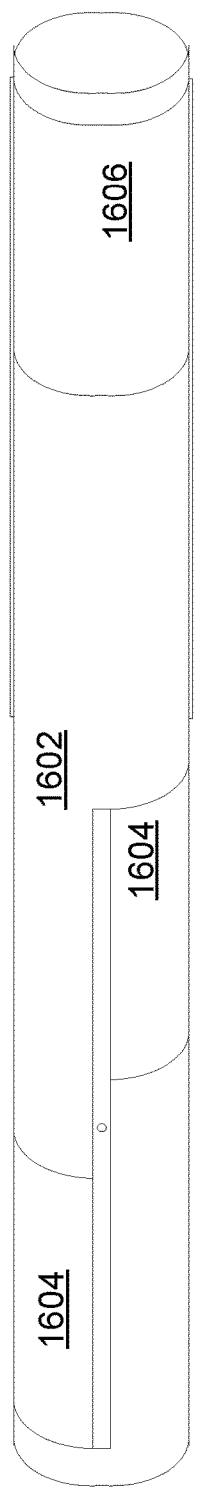
FIG. 16A shows an embodiment of an assembly that may be used in the generator system of FIG. 1 having two flywheels.

FIG. 16A shows an embodiment of assembly 1600. Assembly 1600 may include shaft 1602, flywheels 1604 and 1606. In other embodiments, the assembly 1600 may not have all of the features listed above or may have other features instead of and/or in addition to those listed above.

Assembly 1600 is an assembly in which two flywheels are connected to a turbine shaft. Turbine shaft 1602 is the turbine shaft to which the flywheels are connected. Flywheel 1604 may be oriented at 90 degrees with respect flywheel 1606 and flywheels 1604 and 1606 may operate independently of one another. By placing flywheels 1604 and 1606 at 90 degrees to one another the masses of the flywheels 1604 and 1606 tend to be more evenly distributed about turbine shaft 1602 than were flywheel 1604 and 1606 placed parallel to one another. In an embodiment, flywheels 1604 and 1606 are the same size, which also helps keep an even distribution of mass about the shaft 1602. In another embodiment, flywheel 1604 and 1606 are linked together so that the displacement of each flywheel is the same. In another embodiment, flywheel 1604 and 1606 are related to one another as a control flywheel (e.g., similar to the flywheel of FIGS. 6 and 7) and a flywheel being controlled by the control flywheel (e.g., similar to the flywheel of FIGS. 10 and 11A).

Although flywheels 1604 and 1606 of FIG. 16A are illustrated as being located in places of turbine shaft 601 that does not have cavities, either or both of flywheels 1604 and/or 1606 may have weights that rest in cavities of turbine shaft 601 when the shaft is stationary or not spinning fast enough so that the centrifugal force the springs holding the weights in or on turbine shaft 601. Although flywheels 1604 and 1606 are pivotally mounted to the side of turbine shaft 601, flywheels 1604 and 1606 could be mounted within turbine shaft 1602.

Covered Flywheel

FIG. 16B shows an embodiment of assembly 1650 in which the flywheel is covered. Assembly 1650 may include cover 1652, which may include cylindrical wall 1654, first circular wall 1656 and second circular wall 1658. Assembly 1650 may also include a turbine shaft having first end 1670 and second end 1672. In other embodiments, the assembly 1650 may not have all of the features listed above or may have other features instead of and/or in addition to those listed above.

Assembly 1650 may house the flywheels of FIG. 16A or another set of one or more flywheels. Cover 1652, via cylindrical wall 1654, first circular wall 1656 and second circular wall 1658, may enclose one or more flywheels. Cover 1652 may protect the enclosed flywheels from debris and may provide a more aerodynamic exterior, so that the presence of the flywheel does not create as much air resistance as were cover 1652 not present. Cover 1652 may be constructed from a sturdy light weight material, such as aluminum or plastic. First end 1670 and second end 1672 may be portions of the shaft that stick out of cover 1652. In an embodiment, the flywheels are mounted on the shaft within cover 1652. In another embodiment, the flywheels may be mounted elsewhere and/or there may not be a shaft within cover 1652.

Tables

Figure 17A:
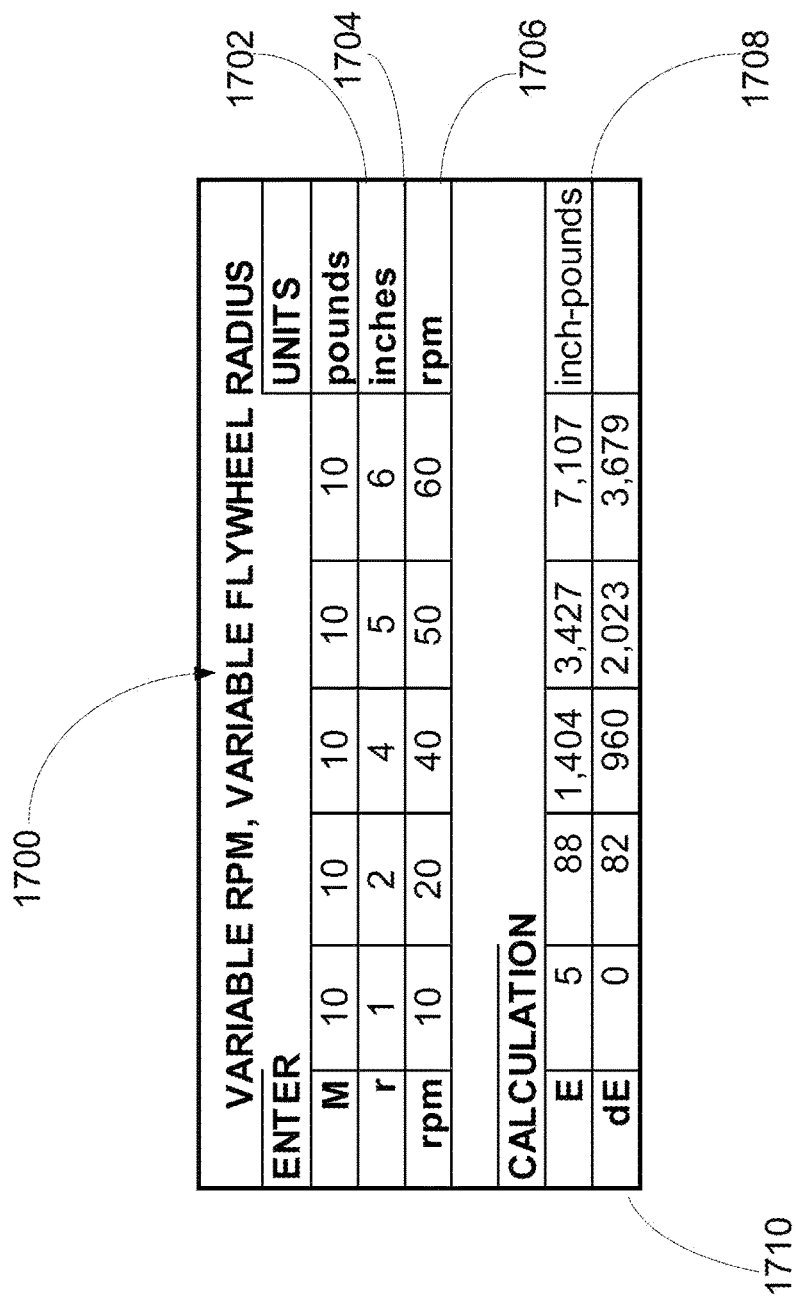
FIG. 17A shows a table of the change in energy as the rotational velocity increases, but with a constant flywheel displacement.

FIG. 17A shows table 1700 of rotational kinetic energies, which shows the change in energy as the rotational velocity increases, but with a constant flywheel displacement. Table 1700 includes mass row 1702, radius row 1704, velocity row 1706, energy row 1708, and change in energy row 1710. In other embodiments, the system associated with table 1700 may not have all of the features listed above or may have other features instead of and/or in addition to those listed above.

Mass row 1702 shows the mass of the turbine, which is kept constant. Radius 1704 shows the effective radius of the flywheel, which is the displacement of the center of mass of the each arm of the flywheel from the center of the turbine shaft. Velocity row shows the rotational velocity of the turbine shaft, which is increased by 10 revolutions per minute in each column. Energy row 1708 shows the rotational kinetic energy that results as the rotational velocity is increased. Change in energy row 1710 shows the change in rotational energy, which results from the change in rotational velocity.

FIG. 17B shows table 1750 of rotational kinetic energies, which shows the change in energy as the rotational velocity increases with a changing flywheel displacement. Table 1750 includes mass row 1752, radius row 1754, velocity row 1756, energy row 1758, and change in energy row 1760. In other embodiments, the system associated with table 1750 may not have all of the features listed above or may have other features instead of and/or in addition to those listed above.

Mass row 1752 shows the mass of the turbine, which is kept constant, and is the same as in mass row 1702. Radius 1754 shows the effective radius of the flywheel, which is the displacement of the center of mass of the each arm of the flywheel from the center of the turbine shaft, which is increased one inch in each column. Velocity row 1756 shows the rotational velocity of the turbine shaft, which is increased by 10 revolutions per minute in each column, as in velocity row 1706 (FIG. 17B). Energy row 1708 shows the rotational energy that results as the rotational velocity is increased. Change in energy row 1710 shows the change in rotational energy that results from the change in rotational velocity.

FIG. 18 shows table 1800 of power densities of various configurations of turbines, which includes air speed column 1802, density column 1804, velocity column 1806 and power density column 1808. In other embodiments, the system associated with table 1800 may not have all of the features listed above or may have other features instead of and/or in addition to those listed above.

Table 1800 shows the computation of the power density output from a turbine at various wind speeds. Air speed column 1802 lists the air speed S for which the power density is computed.

Density column 1804 lists the product of ½ times the density of air at 60 degrees, which is 1.225 Kg/m$^3$, times a the cube conversion factor, C=0.44704, for converting the cube of the velocity from (miles/hour)$^3$ to (meters/second)$^3$, which is given by $C^3=0.44704^3=0.08933194$. Stated differently, the number in the density column 1802 is computed by $(½)\rho C^3=(½)(1.225)0.44704^3=0.05472$. Velocity column 1806 has the same value as speed column 1802.

Power density of column 1808 is given by the value $P/A=(½)\rho S^3$. However, since the air speed is in miles per hour instead of in meters per second, when the conversion factor is included in the formula the formula for power density column 1808 is $P/A=(½)\rho(CS)^3$.

The power density formula can be derived as follows. The formula for the kinetic energy of wind is given by $(½)mS^2$, where m is the mass of the air swept by rotor blades having area A during a given time t. Since power is the time derivative of the energy with respect to time, the wind power is given by $P=dE/dt=(½)(dm/dt)S^2$.

If the air has density $\rho$, the formula for mass m is given by $m=\rho ASt$, and at constant velocity and density, the rate of air flow is given by $dm/dt=\rho AS$. Consequently, the power of the wind $P=(½)(\rho AS)S^2=(½)\rho AS^3$ (which may be given in units of watts).

The power density (or power per unit area through which the air flows) is given by $P/A=(½)\rho S^3$, which is the rate at which energy passes through a unit of area (which may be given in watts per square meter W/m$^2$).

A centrifugal flywheel on a flow turbine with a load may progressively increase the effective radius to limit the maximum rotational velocity with increasing input flow, which can be expected from wind turbines during storms, etc., and which may otherwise exceed the maximum turbine limits and be damaged by high rotational velocity (which may be given in units of rpm) if not properly shutdown or braked.

FIG. 19 shows a table 1900 of power density output of various turbine configurations. Table 1900 may include velocity column 1902, power density column 1904 shows the power density, efficiency column 1906, and columns 1908-1922. In other embodiments, table 1900 may include additional elements and/or may not include all of the components listed above.

Velocity column 1902 shows the velocity of the wind. Power density column 1904 shows the power density at each velocity. Efficiency column 1906 shows the efficiency of the turbine at the wind velocity of velocity column 1902 and power density of power density column 1904. Columns 1908-1922 list the power at each wind speed of velocity 1902 for different distances of the weight from the shaft. Column 1908 lists power outputs for a distance of 1 meter. Column 1910 lists power outputs for a distance of 1.5 meter.

In an embodiment, the centrifugal flywheel may be located on a motor driven energy storage device. The flywheel may store increasing amounts of energy as rotational kinetic energy (up until a limit, which is determined by the terminal velocity corresponding to the current wind speed).

In an embodiment, a smart controller with a motor or hydraulic driven flywheel, any of the centrifugal flywheel features could be controlled in a similar or improved method. In an embodiment, a smart controller with a motor or hydraulic driven flywheel, a flywheel with no load can store progressively more energy with a constant power input, starting with a small radius flywheel and ending with a large radius flywheel integrated over time. An analogy is that a very big flywheel could not get started revolving with a small motor or small energy source. But a small flywheel (small radius mass) could start revolving with a small energy input. Then with a constant small input power, a small flywheel after starting revolving at an initial rotational velocity can now increase the flywheel radius at a nearly constant rotational velocity to store more kinetic energy in the next time interval. This progressively increasing stored energy can continue to some limit in drag. So with low drag and a constant low input power, the kinetic energy may increase at least somewhat with time as the radius is increased.

Method of Operation

Figure 20:
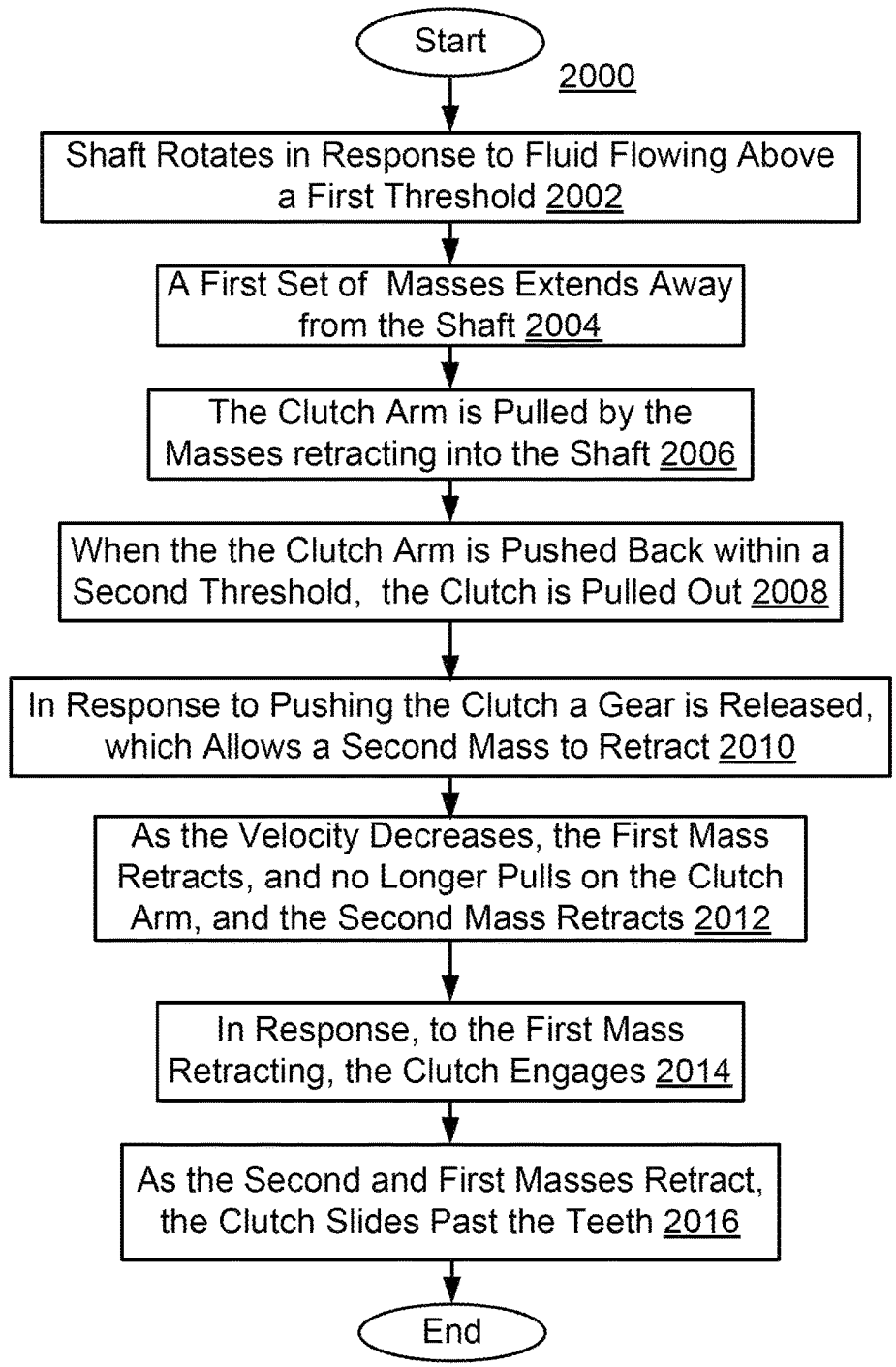
FIG. 20 shows a flowchart of an embodiment of a method of operating the assembly of FIGS. 6-11B.

FIG. 20 shows a flowchart of an embodiment of a method 2000 for operating the invention of FIGS. 6-11B. In step 2002 the turbine shaft 601 rotates in response to fluid flowing above a first threshold. In step 2004, a first set of weights 608 extends away from the shaft 601. In step 2006, the clutch arm 802 or 1004 is pulled by the weights 608 retracting into the turbine shaft 601. In step 2008, when the clutch arm is pushed back within a second threshold, the clutch 1012 is pulled out. In step 2008, in response to pushing the clutch 1012, a gear 1017 is released, which allows a second weight 1018 to retract. In step 2014, as the velocity decreases, the first mass 618 retracts, and no longer pulls on the clutch arm 802 or 1004, allowing the second set of weights 1018 to retract. In step 2014, in response, to the first weight 618 retracting, the clutch 1012 engages. In step 2016, as the second and first set of weights 1018 retracts, the clutch 1012 slides past the teeth 1014.

In an embodiment, each of the steps of method 2000 is a distinct step. In another embodiment, although depicted as distinct steps in FIG. 20, step 2002-2016 may not be distinct steps. In other embodiments, method 2000 may not have all of the above steps and/or may have other steps in addition to or instead of those listed above. In particular the order in which the steps are implemented depends on the sequence of the wind velocities. The steps of method 2000 may be performed in another order. Subsets of the steps listed above as part of method 2000 may be used to form their own method.

Method of Making

Figure 21:
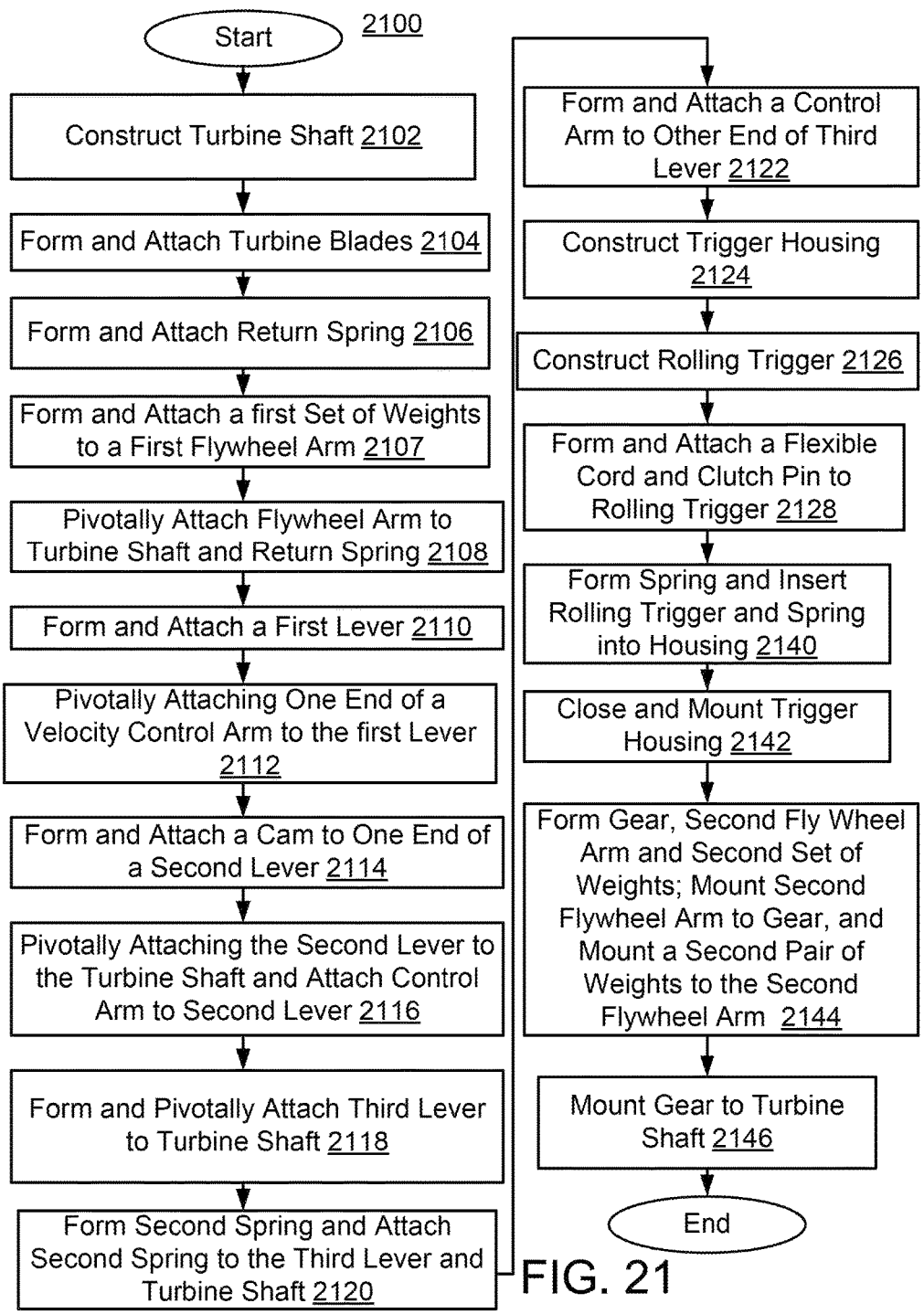
FIG. 21 shows a flowchart of an embodiment of a method of using the assembly of FIGS. 6-11B.

FIG. 21 is a flowchart of an embodiment of method 2100 of making the assembly of FIGS. 6-11B. In step 2102, turbine shaft 601 is constructed. Turbine shaft may be hollow or solid. If turbine shaft 601 (FIGS. 6 and 7) is hollow, step 2102 may include, constructing a core and supports that support the core with in turbine shaft 601. Additionally step 2102 may include attaching the supports to the core and attaching the shell of the shaft to the supports. Step 2102 may include forming flywheel cavities 610 within turbine shaft 601 for storing weights 608 (FIGS. 6 and 7). Step 2104 may include forming the turbine blades 112 (FIG. 1) and attaching the turbine blades to the turbine shaft 601.

Step 2106 may include forming and attaching return springs 612 (FIGS. 6 and 7) to the turbine shaft 601. In step 2107, flywheel arms 608 may be formed. Weights may be formed and attached to flywheel arms 608 (FIGS. 6 and 7) (which is a first of two flywheel arms. Step 2108 may include pivotably attaching flywheel arm 618 to turbine shaft 601 by (for example) attaching a pivot bearing to the first flywheel arm 618 and attaching flywheel arm 618 to return springs 612. Step 2110 may include attaching one end of a lever 604 (FIGS. 6 and 7) to flywheel arm 618 and/or to the pivot bearing. Step 2112 may include pivotally attaching one end of a velocity control arm 606 or 812 (FIGS. 6 and 7 or 8 and 9), which may include attaching control arm 606 or 812 to a pivot bearing and attaching the pivot bearing to the other end of lever 604.

Step 2114 may include attaching a cam 806 (FIGS. 8 and 9) to a first end of a lever 808. Step 2116 may include pivotably mounting lever 808 on the turbine shaft 601, which may include mounting a pivot bearing to the turbine shaft 601 (FIGS. 6 and 7) and the second lever (e.g., lever 808). Step 2116 may include attaching the other end of the control arm 606 or 812 to the other end of second lever (e.g., lever 808), which may include attaching a pivot bearing to both the control arm and second lever (e.g., lever 808). In step 2118, a two-position lever 804 is pivotally attached to turbine shaft 601, which may include attaching a pivot bearing to the turbine shaft 601 and to the two-position lever 804. The two-position lever 804 being shaped and mounted so that as the second lever (e.g., lever 808) rotates the cam 806 pushes the two-position lever 804 to another position. In step 2120, a spring 810 is formed and attached to the two-position lever 804 and turbine shaft 601, so as to pull the two-position lever 804 into one of two-positions. One end of the spring 810 may be attached to one end of the two-position lever 804 on one side of a pivot point of the two-position lever 804 and the other end of the spring 810 may be attached to a portion of turbine shaft 601 on another side of the pivot point of the two-position lever 804. In step 2122, a second control arm 802 is pivotably attached to one end of the two-position lever 804. The second control arm 802 extends away from the two-position lever 804 in the opposite direction as the first control arm 606 or 812.

In step 2124, a trigger housing 802 or 1004 is constructed leaving one end open to inserting the rolling trigger 1010 and a spring 1007. An opening in also left in a portion of the opposite end, so as to allow the clutch pin 1012 to stick out. In step 2126, the rolling trigger 1010 is constructed with wheels or bearings 1008*a-c* for rolling within the trigger housing 1006. In step 2128, the clutch pin 1012 is formed and attached to one end of the rolling trigger 1010 and a flexible cord 1005 is attached to the other end of the rolling trigger 1010. In step 2140, the rolling trigger 1010 and spring 1007 are inserted into the trigger housing 1006 with the trigger pin 1012 sticking out of one end of the trigger housing 1006 and the flexible cord 1005 sticking out of the other end. In step 2142, the trigger housing 1006 is closed so as to hold the spring 1007 and rolling trigger 1010 within the trigger housing 1010, while allowing the clutch pin 1012 and cord 1005 to stick out of opposite ends and slide in and out of the trigger housing 1006 without being hindered by the trigger housing 1006. In step 2144, a flywheel arm is mounted to a gear and weights 1018 are mounted on the flywheel arm. In step 2146, a gear 1017 is attached to turbine shaft 601 on the same side of the trigger housing 1006 as the clutch pin 1012. The gear 1017 is placed at a distance from the trigger housing 1006 so that when the spring 1007 is in its relatively uncompressed position, the clutch pin 1012 engages the teeth 1014 and stops the gear 1017 from rotating. When the spring 1007 is in the compressed position, the clutch pin 1012 disengages from the gear teeth 1014 allowing the gear 1017 to rotate freely in one direction. In an embodiment, all of the components are performed prior to assembling any of the components. Although in the above example, the gears, levers and springs are attached to the exterior of turbine shaft 601, the clutch components, the gears, levers, and springs could be located within turbine shaft 601.

In an embodiment, each of the steps of method 2100 is a distinct step. In another embodiment, although depicted as distinct steps in FIG. 21, step 2102-2148 may not be distinct steps. In other embodiments, method 2100 may not have all of the above steps and/or may have other steps in addition to or instead of those listed above. The steps of method 2100 may be performed in another order. In fact, although component needs to be formed prior to being attached, the attaching and mounting steps could be performed in nearly any order. Subsets of the steps listed above as part of method 2100 may be used to form their own method.

In general, at the beginning of the discussion of each of FIGS. 22-25 is a brief description of each element, which may have no more than the name of each of the elements in the particular figure that is being discussed. After the brief description of each element, each element of FIGS. 22-27 is further discussed in numerical order. In general, each of FIGS. 22-27 is discussed in numerical order, and the elements within FIGS. 22-27 are also usually discussed in numerical order to facilitate easily locating the discussion of a particular element. Nonetheless, there is not necessarily any one location where all of the information of any element of FIGS. 22-27 is located. Unique information about any particular element or any other aspect of any of FIGS. 22-27 may be found in, or implied by, any part of the specification.

Figure 22:
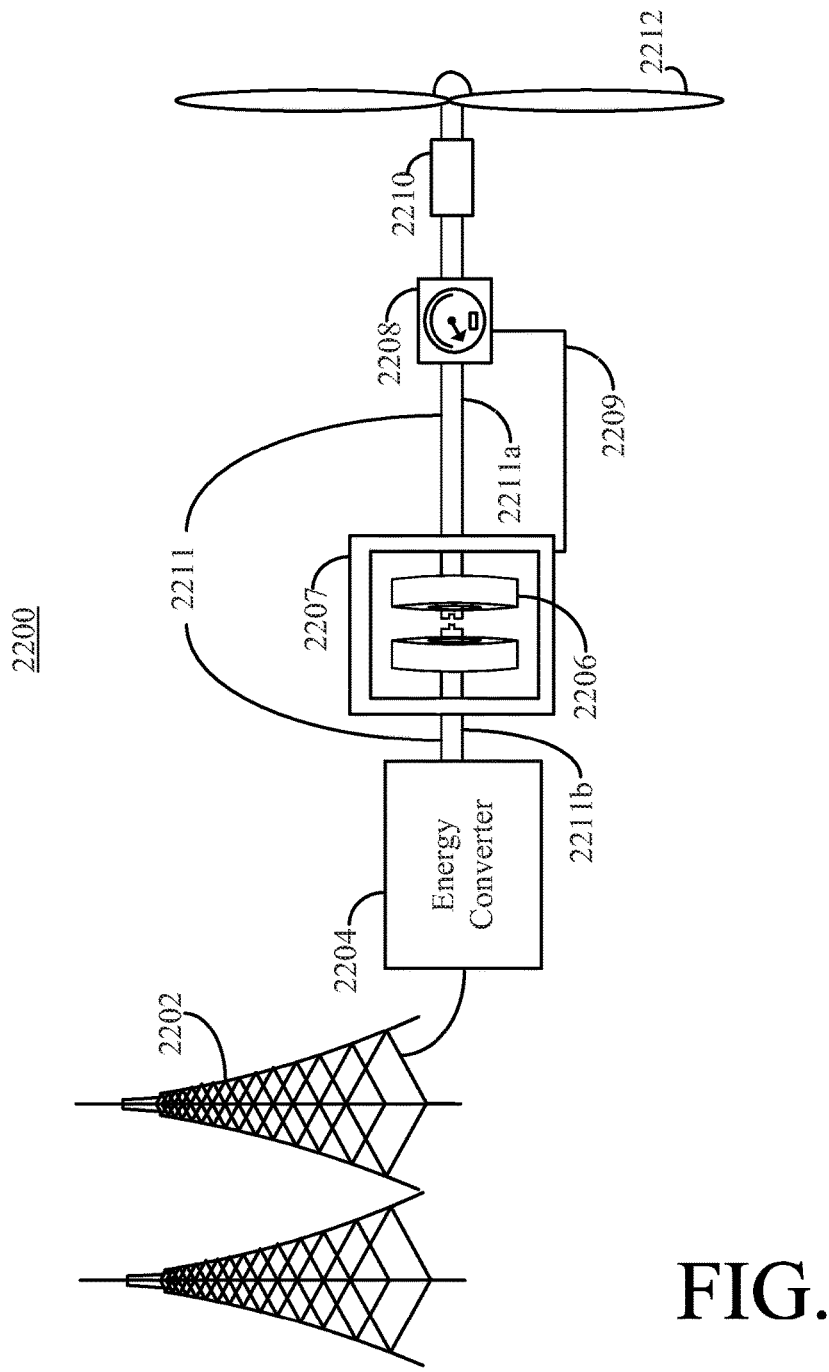
FIG. 22 shows a block diagram of an embodiment of a pulsed generator.

FIG. 22 shows a diagram of an embodiment of pulsed system 2200. Pulsed system 2200 includes electrical load 2202, converter 2204, clutch 2206, clutch control 2207, speed sensor 2208, wiring 2209, rotational mass 2210, shaft 2211 having first shaft segment 2211*a* and second shaft segment 2211*b*, and turbine 2212. In other embodiments, pulsed energy transfer system 2200 may not have all of the components listed above or may have other components instead of and/or in addition to those listed above.

Pulsed system 2200 may convert the energy of the flow of a fluid (e.g., air, water, gas) into electrical energy. Pulsed system 2200 may be capable of converting fluid flow into electricity in conditions where the flow rate of a fluid is too low for converting fluid flow into electricity without pulsed system 2200, by pulsing (e.g., periodically engaging and disengaging) an energy converter so that the energy converter converts the energy only during certain periods of time, which may be brief in duration and may occur frequently in succession and may be continuous. In an embodiment, pulsed system 2200 may store rotational energy at low-flow conditions while disconnected from an electrical load, and then be connected to transfer energy to an electrical load. In the specification, the term "low-flow" refers to conditions wherein the flow of moving fluid is insufficient for overcoming resistive force, such as static and kinetic friction, drag on the turbine blades, and resistive forces resulting from Lenz's law and from electrical load 2202. Consequently, in such conditions the components are unable to generate mechanical energy efficiently or at all. Further, the term "hi-flow" refers to conditions wherein the flow of moving fluid is sufficient for overcoming the static friction and drag acting on the components, and in which the components are able to generating mechanical energy.

Electrical load 2202 may represent a consumption of power associated with devices or structures that receive electrical energy from pulsed energy transfer system 2200. For example, electrical load 2202 may be one or more electrical appliances, a series of batteries that receive and store energy for future use, a home wired to receive generated energy, or a portion of an electrical grid that transmits power to general consumers.

Energy converter 2204 may convert mechanical energy into electrical energy and transfer the electrical energy to electrical load 2202. For example, energy converter 2204 may be a generator, alternator, inverter, or combination thereof. In an embodiment, energy converter 2204 may receive kinetic energy generated by the rotation of a fan, turbine or other device capable of producing mechanical energy from the flow of moving fluids. Energy converter 2204 may convert received energy into electrical energy, and transfer the electrical energy to electrical load 2202. In another embodiment, energy converter 2204 may receive and carry out instructions from an external device for connecting to or disconnecting from electrical load 2202.

Clutch 2206 may engage or disengage to allow or disallow the transmission of rotational energy between segments of a rotatable shaft. In an embodiment, clutch 2206 may join a segment of a rotatable shaft connected to a device for generating mechanical energy (e.g., a turbine) to a segment of rotatable shaft connected to a device for converting mechanical energy into electrical energy (e.g., energy converter 2204) at a slower speed in a manner such that a plot of energy verses energy output may exhibit a hysteresis. In an embodiment, clutch 2206 may be an automatically operating centrifugal clutch. For example, as the segment of the rotatable shaft connected to clutch 2206 increases in rotations per minute, weighted arms within clutch 2206 may extend outward, causing clutch 2206 to engage and join the segments of the rotatable shaft. As a result of the engaging of clutch 2206, the amount of torque required to turn the rotatable shaft increases, and in low-flow conditions there may not be enough energy in the rotating turbine to sustain the continued rotation of the rotatable shaft, which may cause the rotatable shaft to slow its rate of rotation. The weighted arms may be mechanically biased (e.g. spring biased) to move inwards. Consequently, the slowing of the rate of rotation may cause clutch 2206 to disengage (e.g., as a result of the weighted arms moving inwards) causing the segments of the rotatable shaft to separate.

Optional clutch control 2207 may receive a signal from a device that detects the rotational speed of the shaft, and engage or disengage clutch 2206 based on the signal. Clutch control 2207 may be capable of evaluating other signals relevant to the performance of pulsed system 2200. Optionally, clutch 2206 may engage when the turbine speed is above a first threshold and disengage when the turbine speed is below a second threshold that is lower than the first threshold.

Speed sensor 2208 may detect the rotational speed (e.g. Rotations Per Minute) of a rotatable shaft, and send a signal to clutch 2206 or clutch control 2207 to engage or disengage clutch 2206 based on the detected speed. In an embodiment, speed sensor 2208 may be a tachometer. In an embodiment, speed sensor 2208 may be communicatively wired to send electrical or mechanical signals to clutch 2206 or clutch control 2207. Speed sensor 2208 may be capable of determining a speed at which engaging or disengaging clutch control 2206 is preferable. For example, pulsed system 2200 may provide an optimized method of energy transfer based on the amount of rotation of a fan and/or rotatable shaft detected by speed sensor 2208. The energy transfer method may include, on detecting conditions wherein the flow of moving fluid received by pulsed system 2200 is low, uncoupling (e.g., disengaging) clutch 2206. As a result of the uncoupling, the resistive load forces are less and the ability of the available flow to overcome resistive forces and generate rotational energy increases. Further, as the generation of rotational energy increases, energy is stored until speed sensor 2208 detects an amount of rotation that can transfer energy to energy converter 2204.

Wiring 2209 may carry an electrical or mechanical signal from speed sensor 2208 to clutch 2206 and/or clutch control 2207 for causing clutch 2206 to be engaged or disengaged.

Rotational mass 2210 may be a weight loaded onto a rotatable shaft for increasing the angular momentum of the shaft. In an embodiment, rotational mass 2210 may act as an energy storage device for a rotatable shaft receiving mechanical energy from a turbine, or similar device. As a result of the energy storage provided by rotational mass 2210 and the angular momentum of mass 2210, the rotation of the shaft may be prolonged beyond the amount that would be expected were rotational mass 2210 not present. Consequently, more mechanical energy may be available for transfer to energy converter 2204.

Shaft 2211 may receive and transfer rotational energy. In an embodiment, shaft 2211 may have at least two segments, which includes at least a first shaft segment 2211*a* and second shaft portion 2211*b*, that connects to a clutch and receives the rotational energy of a turbine or other device for making use of the flow of moving fluids, and a second segment that engages a different end of the clutch and (when clutch 2206 is engaged) transfers the rotational energy to energy converter 2204. For example, clutch 2206 may engage and/or disengage first shaft segment 2211*a* to/from second shaft segment 2211*b*. First shaft segment is attached to the turbine and rotates when turbine 2202 is rotated by the flow of fluid. Second shaft segment 2211*b* is connected to energy converter 2204, and rotating second shaft segment 2211*b* may cause energy converter 2204 to convert the rotational energy of second shaft segment 2211*b* into electrical energy. Thus, by connecting first shaft segment 2211*a* to second shaft segment 2211*b* causes the energy in the rotating turbine to rotate first shaft segment 2211*a*, which in turn rotates second shaft segment 2211*b*, which in turn causes energy converter 2204 to convert the rotational energy into electrical energy. In contrast, when clutch 2206 disengages, although the turbine rotates first shaft segment 2211a, first shaft segment 2211a does not rotate second shaft segment 2211b (because first shaft segment 2211a and second shaft segment 2211b are not connected), and consequently energy converter 2204 does not convert rotational energy into any other form of energy (because second shaft segment 2211b is not rotating).

Turbine 2212 may receive the flow of a moving fluid (e.g., air, water, gas) to generate mechanical energy. In an embodiment, turbine 2212 may be any of a plurality of bladed devices capable of utilizing the kinetic energy of a moving fluid.

Turbine 2212 may be connected to shaft 2211, via first shaft segment 2211a having rotational mass 2210. Consequently, turbine 2212 initiates the activity of pulsed system 2200. For example, a moving fluid causes the blades of turbine 2212 to turn, the turning causing the rotation of shaft 2211 which is measured by speed control 2206. As the rotational speed increases, clutch 2206 engages due to centrifugal force or the signals transmitted by speed sensor 2206. Upon engaging, the rotational energy is received by energy converter 2204 and converted to electrical energy. Energy converter 2204 sends electrical energy to electrical load 2202. Energy converter 2204 creates drag on turbine 2212 and rotating shaft 2211. As the drag increases the rotation slows until clutch 2206 is caused to disengage, allowing turbine 2212 and rotation shaft 2211 to rotate faster. The disengaging of clutch 2206 may decrease the amount of torque needed for rotatable shaft 2211 to turn, and subsequently the amount of energy (e.g., flow of moving fluid) required for causing the segment of rotatable shaft 2211 connected to turbine 2212 to rotate. Engaging clutch 2206 after the turbine is turning allows energy converter 2204 to receive the rotational energy generated while clutch 2206 was disengaged.

Figure 23:
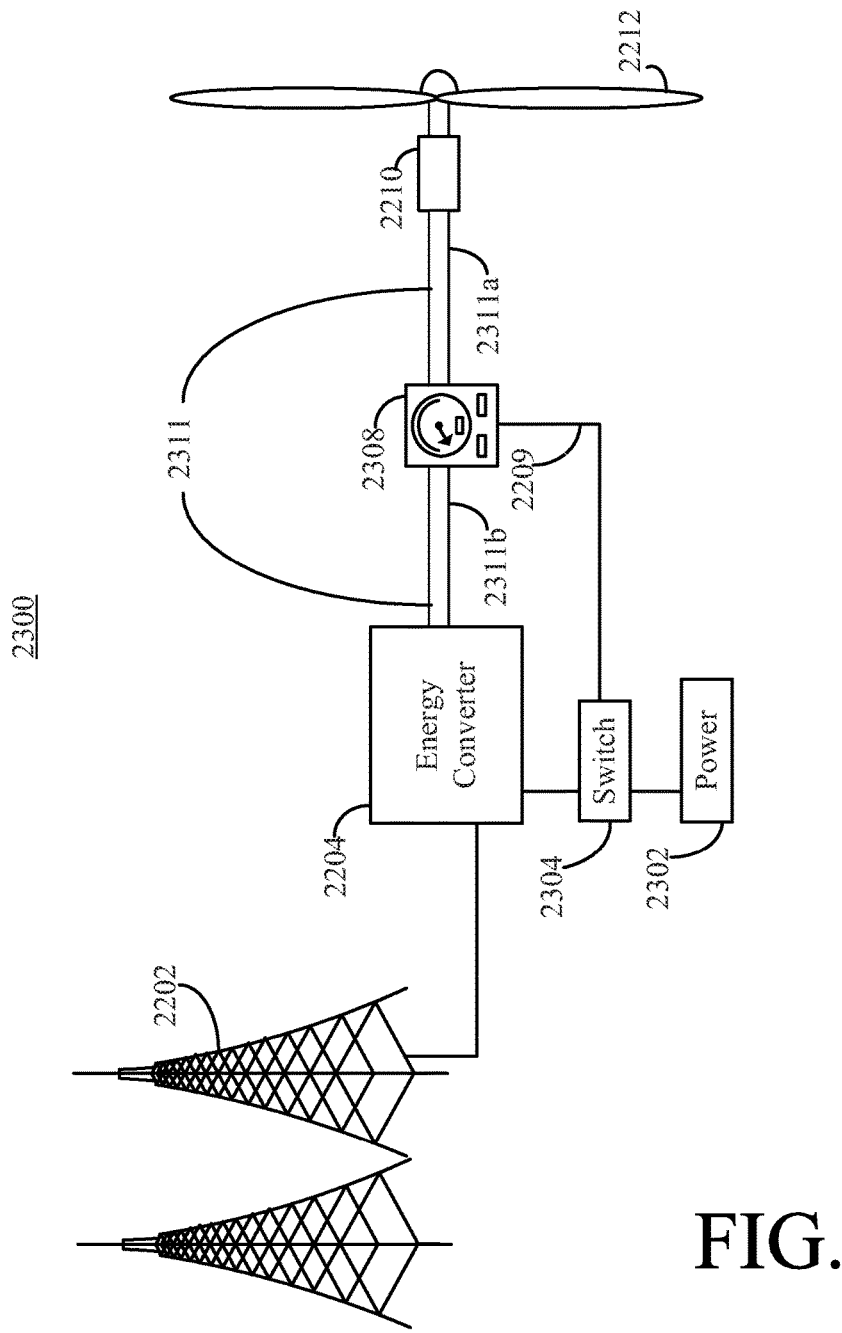
FIG. 23 shows a block diagram of an embodiment of a pulsed generator having a control switch for a magnetic field.

FIG. 23 shows a diagram of an embodiment of pulsed system 2300. Pulsed system 2300 includes electrical load 2202, converter 104, wiring 2209, rotational mass 2210, turbine 2212, power supply 2302, switch 2304, speed sensor 2308, and shaft 2311 having first shaft segment 2311a and second shaft segment 2211b. In other embodiments, pulsed generator 2300 may not have all of the components listed above or may have other components instead of and/or in addition to those listed above.

Electrical load 2202, converter 2204, wiring 2209, rotational mass 2210, and turbine 2212 were discussed above in conjunction with FIG. 22.

Power supply 2302 may provide current for powering an electromagnet within energy converter 2204 that creates a magnetic field within energy converter 2204, which coils attached to shaft 2311 rotate within to generate electricity. In an embodiment, power supply 2302 may receive electricity from energy converter 2204, which may be converted into a form for generating an appropriate magnetic field. Switch 2304 allows or disallows the flow of electricity from power supply 2202 to the electromagnet of energy converter 2204. Speed sensor 2308 controls the on/off state of switch 2304 to determine whether electric converter 2204 receives power from power supply 2302. In an embodiment, speed sensor 2308 monitors the rotation of shaft 2311, deactivating switch 2304 when the rotations per minute are below a first threshold value, and activating switch 2304 when the rotations per minute are above a second threshold value that is higher than the first threshold. Speed sensor 2308 may be an embodiment of speed sensor 2208 (of FIG. 22) having a wired connection to a switch for turning energy converter 2204 on or off. Shaft 2311 is similar to shaft 2211, except that first shaft segment 2211a and second shaft segment 2311b may be integrally connected to one another, whereas first shaft segment 2211a and second shaft segment 2211b can be connected and disconnected to one another.

Figure 24:
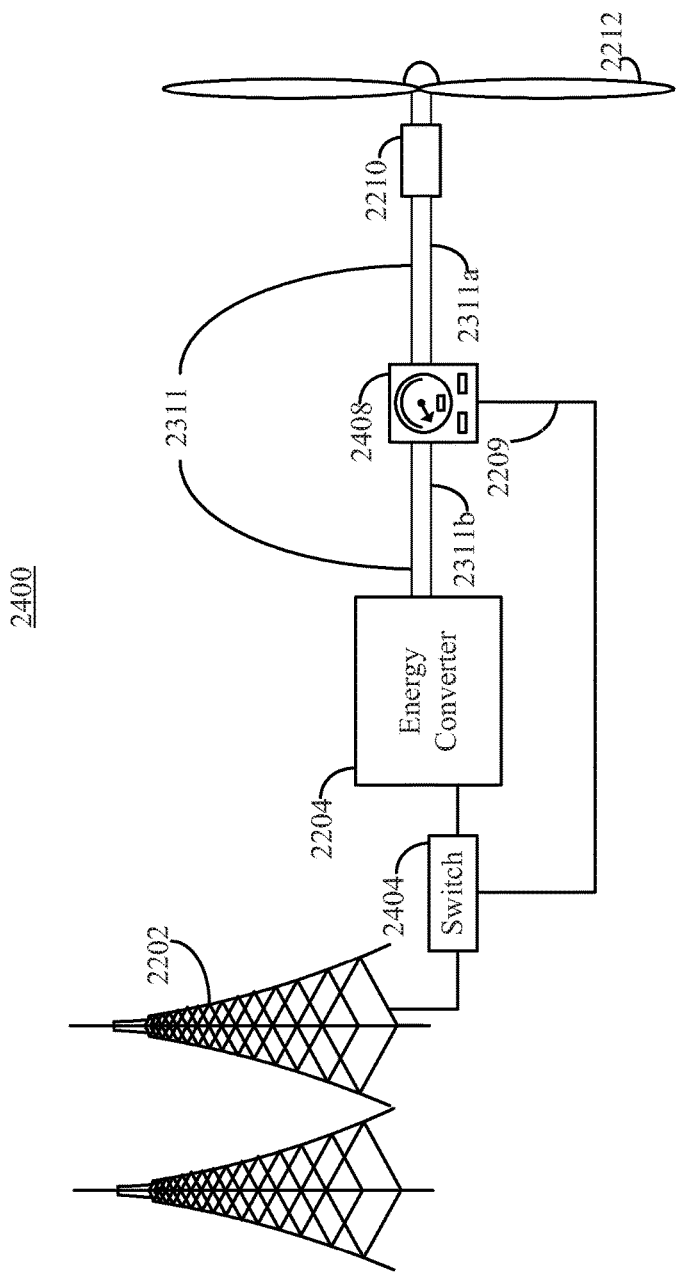
FIG. 24 shows a block diagram of an embodiment of a pulsed generator having a control switch for an energy converter.

FIG. 24 shows a diagram of an embodiment of pulsed system 2400. Pulsed generator 2400 includes electrical load 2202, converter 2204, wiring 2209, rotational mass 2210, turbine 2212, shaft 2311 having first shaft segment 2211a and second shaft segment 2211bswitch 2404 and speed sensor 2408. In other embodiments, pulsed system 2400 may not have all of the components listed above or may have other components instead of and/or in addition to those listed above.

Electrical load 2202, converter 2204, wiring 2209, rotational mass 2210, and turbine 2212 were discussed above in conjunction with FIG. 22. Shaft 2311, first shaft segment 2311a, second shaft segment 2311b were discussed in conjunction with FIG. 23.

Switch 2404 allows or disallows the flow of electricity from energy converter 2204 to electrical load 2202. Speed sensor 2408 may be an embodiment of speed sensor 2208 having a wired connection to a switch for opening or closing an electrical connection between energy converter 2204 and electrical load 2202. In an embodiment, speed sensor 2408 may open switch 2404 (disconnecting electrical load 2202) when a first threshold speed is detected, and close switch 2404 (connecting electrical load 2202) when a second threshold speed is detected that is higher than the first threshold speed. In an embodiment, electrical load 2202 may be connected to and disconnected from an energy converter within system 2400 for enabling the usage, storage or transmission of power generated by pulsed system 2400. As a result of electrical load 2202's consumption of power when connected to an energy transferring component of system 2400, load impedance may increase and induce drag on components of system 2400 (e.g., a fan or turbine). Consequently, when disconnected from an energy transferring component of system 2400, the drag on components of system 2400 decreases, allowing turbine 2212 to spin more freely and store energy.

Figure 25:
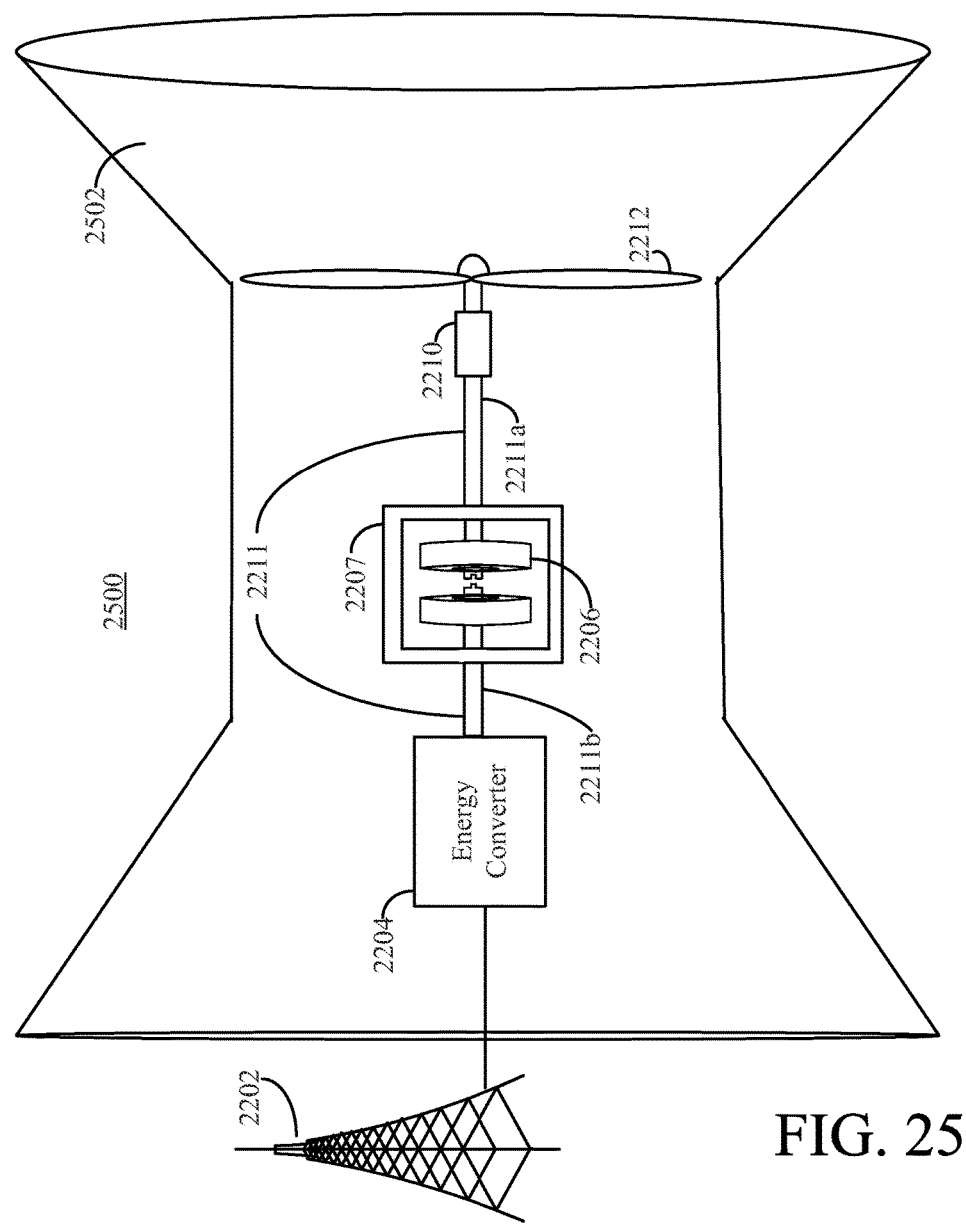
FIG. 25 shows a block diagram of an embodiment of a pulsed generator having a flow condensing funnel.

FIG. 25 shows a diagram of an embodiment of flow condensing system 2500. Flow condensing system 2500 includes electrical load 2202, converter 2204, clutch 2206, clutch control 2207, rotational mass 2210, shaft 2211, turbine 2212, and condenser 2502. In other embodiments, flow condensing generator 2500 may not have all of the components listed above or may have other components instead of and/or in addition to those listed above.

Electrical load 2202, converter 2204, clutch 2206, clutch control 2207, rotational mass 2210, shaft 2211, first shaft segment 2211a, second shaft segment 2211b, and turbine 2212 were discussed above in conjunction with FIG. 22.

Flow condensing system 2500 may direct moving fluid inwards against turbine 2212 to increase the volume of fluid that flows through flow condensing system 2500 for generating energy (as compared to systems not having any flow condensing). In an embodiment, flow condensing system 2500 may direct more fluid towards turbine 2212 at a faster rate of flow than would be expected without the flow condensing components of flow condensing system 2500. Condenser 2502 may condense fluid flowing towards turbine 2212. As the fluid flows through the narrow portion of condenser 2502, the rate of flow increases. In an embodiment, condenser 2502 may have a funnel shape capable of increasing the volume of fluid sent to turbine 2212. Condenser 2502 has a funnel shape that has a wide opening facing oncoming fluid that is directed towards turbine 2212.

Condenser 2502 narrows in a direction moving away (or down stream) from the opening towards the blades of turbine 2212, but stays the same width once the turbine blades are reached and either gets wider or stays the same width once past for down stream from) the turbine blade in the direction of the fluid flow. In an embodiment, the inlet and outlet ends may be reversed to flow in the other direction with no effect on operation. The wide exit portion of condenser 2502 is optional.

Any of the embodiments of FIGS. 22-25 may be used together in any combination to get different embodiments. For example, clutch 2206 and clutch control 2207 (which engages or disengages the shaft of the generator) may be used together with any of the embodiments of FIGS. 23-25. Switch 2304 for turning off the current in the electromagnet and switch 2404 for electrically disconnecting the grid or another electrical load may be included in the same embodiment, which in one embodiment includes and in another embodiment does not include rotational mass 2212, and which may or may not include condenser 2502. In any of the embodiments in this specification, the electrical loads and/or mechanical loads (e.g., grid 2202, energy converter 2204, and/or mass 2210), via switches 2304 or 2404, or clutch 2206 (e.g., via clutch control 2207), may be engaged or disengaged periodically at regular intervals or at irregular intervals of time. In an embodiment the intervals of time may depend on the speed of the fluid. The thresholds for engaging and disengaging the various mechanical and/or electrical loads and/or turning on and off the magnetic field may be the same or different from one another no matter which of the embodiments are combined together or are not combined together. Also, any auxiliary turbine (if any are present) may be constructed in the same fashion as any one of or any combination of the turbines of FIG. 22. Thus, any auxiliary turbine for supplying a current to the magnetic field generating coils may have its own set of thresholds. Similarly, any auxiliary turbines (if any) may also have switches for engaging and disengaging an electrical load (e.g., the current supplied by the auxiliary turbine to the magnetic field producing coils of a main turbine) and/or the magnetic field coils of the auxiliary turbine. Additionally or alternatively, any auxiliary turbine may have a clutch for engaging and disengaging a rotational mass on the shaft of the auxiliary turbine and/or two portions of the shaft of the auxiliary turbine (engaging and disengaging the two portions of the shaft of the auxiliary turbine may engage and disengage the energy converter of the auxiliary turbine).

Figure 26:
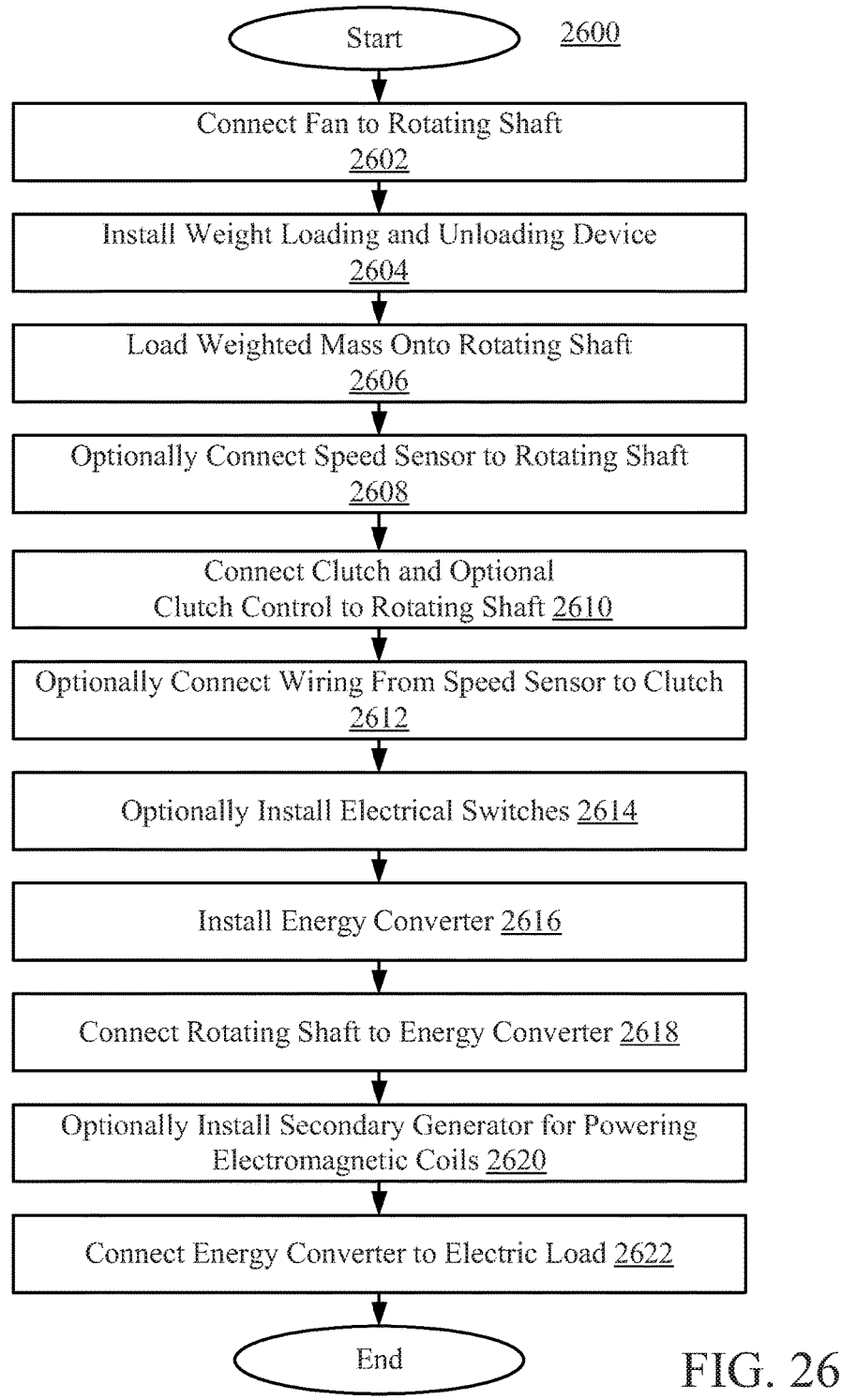
FIG. 26 shows a flowchart of an example of a method of assembling a pulsed generator system.

FIG. 26 is a flowchart of an example of a method 2600 of making a pulsed energy generator.

In step 2602, a rotatable shaft is attached to a propeller to form a turbine.

Step 2602 may include forming the propeller to increase the propellers ability to make use of the motion of a moving fluid. For example, the propeller may be formed into the shape of a wing for enhancing the lift on the propeller caused by moving air. The rotatable shaft may be formed of materials known to minimize resistive forces acting on the rotatable shaft as it turns.

In optional step 2604, a device for loading and unloading a weighted mass onto and off of shaft 2211 may be installed. In optional step 2606, a weighted mass is loaded onto the rotating shaft.

In step 2608, speed sensor (such as speed sensor 2208, 2308 or 2408 of FIGS. 22-24) is connected to the rotating shaft. Step 2608 may include, attaching the speed sensor to the rotatable shaft at a segment of the shaft containing a feature (e.g., a hole) for allowing speed sensor to make measure the rotations of rotatable shaft 2211. For example, speed sensor may send a beam of light through a hole in rotatable shaft 2211, and determine the number of times the beam of light is broken over a period of time (e.g., 60 seconds).

In step 2610, optional clutch 2206 and/or optional clutch control 2207 are connected to rotating shaft 2211. Step 2610 may include attaching a portion of the clutch to a segment of shaft 2211 joined to turbine 2212, and attaching a second portion of the clutch to a segment of the shaft joined to energy converter 2204. As part of step 2610, the interlocking function of the portions of clutch 2206 may be tested.

In optional step 2612, wiring for sending a signal from speed sensor to clutch 106 and/or optional clutch control 2207 is installed. Step 2612 may include attaching a wire capable of transmitting electrical current to a connector on clutch control 2207 for receiving a current and speed sensor 2208 for sending a current. Optionally, the wiring may be attached directly to clutch 2206.

In optional step 2614, electrical switches for engaging clutch 2206 and controlling the transmission of energy to electrical grid 2202 are installed.

In step 2616 energy converter 2204 is installed.

In step 2618, shaft 2211 is connected to energy converter 2204. Step 2618 may include moving a section of shaft 2211 having coils into a portion of energy converter 2204 capable of producing an electromagnetic field.

In optional step 2620, a secondary generator for powering the electromagnetic field coils of energy converter 2204 is installed.

In step 2622, energy converter 2204 is connected to electrical load 2202.

Step 2622 may include wiring energy converter 2204 to directly or indirectly (e.g., via an electrical control switch) transmit electrical energy to electric load 2202.

In an embodiment, each of the steps of method 2600 is a distinct step. In another embodiment, although depicted as distinct steps in FIG. 26, steps 2602-2622 may not be distinct steps. In other embodiments, method 2600 may not have all of the above steps and/or may have other steps in addition to or instead of those listed above. The steps of method 2600 may be performed in another order. Subsets of the steps listed above as part of method 2600 may be used to form their own method.

Figure 27:
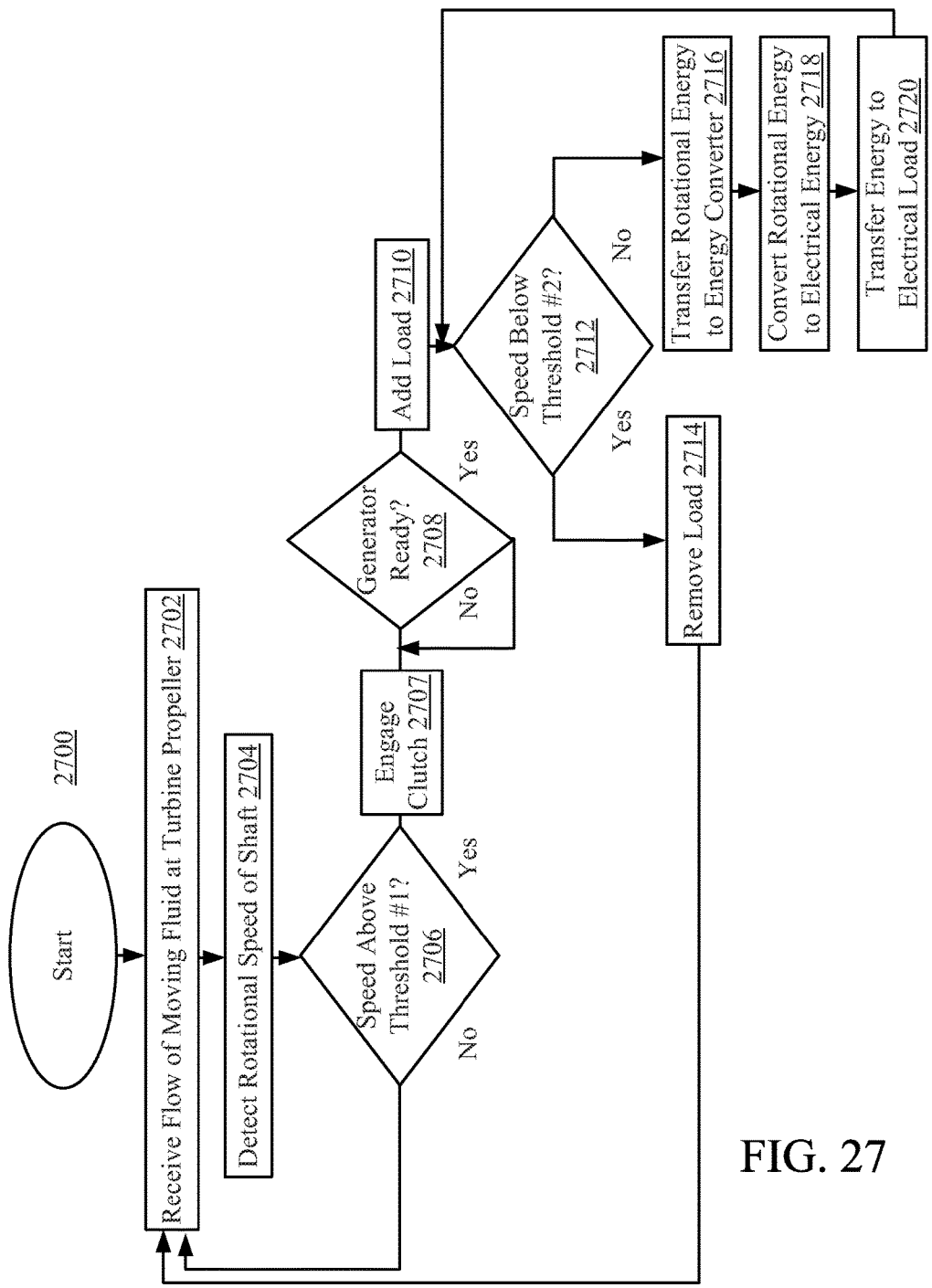
FIG. 27 shows a flowchart of an example of a method of using a pulsed generator system.

FIG. 27 is a flowchart of an example of a method 2700 of using a pulsed system. In step 2702, the flow of a moving fluid is received at turbine 2212. Step 2702 may include the generation of mechanical energy from the flow of the moving fluid.

In optional step 2704, the rotational speed of shaft 2211 is detected by a speed sensor, such as speed sensor 2208, 2308, 2408 or a similar device for detecting rotational speed. If a mechanical clutch is used there may not be an actual determination of the speed of the turbine.

In step 2706, in an embodiment, the rotational speed of shaft 2211 is compared to a first threshold value. If the rotational speed is insufficient for engaging the clutch, the method returns to step 2702 for generating mechanical energy or remains in step 2702. In the case of an automatic mechanical clutch, the decision represented by step 2706 is not expressly carried out. Instead, when the rotational speed is insufficiently the centrifugal force is not high enough to cause the clutch to engage and so the clutch does not engage, and method 2700 remains in step 2702. When the speed is above the first threshold value, as result of the decision of step 2706, the method continues to optional step 2707 or to step 2708 or 2710 if step 2707 is not present. In the case of an automatic mechanical clutch, when the rotational speed is sufficiently high the centrifugal force causes the clutch to engage, which brings method 2700 to optional step 2707 or to step 2708 or 2710 if step 2707 is not present, without a decision expressly being made. In step 2707, clutch 2206 engages shaft 2211, thereby engaging energy converter 2204 after step 2707, method 2700 continues to step 2708.

In optional step 2708, a determination is made whether an electromagnetic field generator for at least partially powering energy converter 2204 is ready. When a desired electromagnetic field is generated (or reaches a certain strength), the method continues to optional step 2710. If energy converter 2204 has an external power source, if the generator uses permanent magnets, or if the coils that produce the magnetic field (e.g., the coils of the stator) are powered by a secondary generator that uses a permanent magnet of producing the magnetic field, step 2708 may be unnecessary.

In optional step 2710, electrical load 2202 is connected to energy converter 2204, causing the resistive forces of electrical load to act on the circuit having energy converter 2204 and turbine 2212. Additionally or alternatively, load 2210 is added to the shaft 2211 (e.g., as a result of centrifugal force on a second clutch located in the vicinity of load 2210 or a signal sent to a mechanical device control from a speed sensor that loads load 2210 onto shaft 2211.

In optional step 2712, the rotational speed of shaft 2211 is compared to a second threshold value, which causes a signal to be sent to disengage clutch 2206. Alternatively, the rotational speed of shaft 2211 may reach a velocity at which centrifugal forces (e.g., even with the are assistance of any frictional forces acting on the clutch arms that keep the clutch arms extended and engaged) are insufficient to keep the automatic clutch engaged. Optionally, the second threshold is lower than the first threshold. In another embodiment, the first threshold is the same as the second threshold.

In step 2714, as a result of a rotational rate lower that the second threshold value, or too small to keep an automatic clutch engaged, electrical converter 104 is disconnected from shaft 2211 and turbine 2212, significantly diminishing the resistive forces acting on shaft 2211 and turbine 2212 (e.g., the electrical load and mechanical drag). Method 2700 then returns to the mechanical energy generation of step 2702. When the rotational speed is above the second threshold value, or above a velocity at which resistive forces are insufficient to cause an automatic clutch to disengage, the method continues to step 2716. In the case of an automatic clutch that is activated mechanically steps 2714 and 2716 may not be two distinct steps and/or step 2714 may not be a distinct decision process. Alternatively, the rotational speed of shaft 2211 may be measured and when send threshold is reached a signal is sent to disengage clutch 2206.

In step 2716, as a result rotational speed exceeding the second threshold value, or due to an amount of rotation great enough for an automatic clutch to remain engaged, the rotational energy generated as a result of steps 2702-2712 is transferred to energy converter 2204. In step 2716, a segment of shaft 2211 having coils (e.g., the rotator) may rotate within an electromagnetic field of energy converter 2204. As a result of the spinning of coils within the magnetic field, an electrical current may be generated in the rotator. Although in this specification, as an example, the stator coils generate the magnetic field and the rotator coils moving in the magnetic field generate a current the rotator coils may by powered to generate a magnetic field and the electric current may be generated in the coils of the stator.

In step 2718, the spinning of the coiled segment of shaft 2211 within the electromagnet of energy converter 2204 (step 2716) creates an electrical current.

In step 2720, the electrical energy generated by energy converter 2204 is transferred to electrical load 2202. Step 2720 may include the maintaining of an optional electrical switch in a closed position for allowing the flow of electrical current from energy converter 2204 to electrical load 2202. Alternatively, the transfer of electrical energy from energy converter 2204 to load 2202 may be an automatic process. Although listed as separate and distinct steps, each of steps 2716-2720 may not be separate and distinct steps, but just different aspects of what happens or simultaneous events that occur while a powered by a turbine generator is generating electricity, for example.

In an embodiment, each of the steps of method 2700 is a distinct step. In another embodiment, although depicted as distinct steps in FIG. 6, steps 2702-2720 may not be distinct steps. In other embodiments, method 2700 may not have all of the above steps and/or may have other steps in addition to or instead of those listed above. The steps of method 2700 may be performed in another order. Subsets of the steps listed above as part of method 2700 may be used to form their own method.

Other Embodiments (Embodiment 1) A system comprising a turbine for converting energy of a flowing medium into electrical energy, a load; the load having at least two states, in a first of the at least two states the load is engaged with the turbine, slowing the speed at which the turbine spins, and in a second of the at least two states the load is disengaged from the turbine, the load being configured such that the load engages the turbine at a first threshold value, which is a turbine speed that is high enough to generate energy for duration of time after the load engages, while the turbine slows down as a result of the load engaging, but that is not high enough for the turbine to continue to generate energy with the load engaged, and the load disengages from the turbine when the speed of the turbine is below a second threshold value, the second threshold value being less than the first threshold value; a controller that periodically engages and disengages the load from a turbine at fixed intervals of time, while the fluid flows at a fixed speed; the time interval being dependent on a fluid speed of the fluid.

(Embodiment 2) The system of embodiment 1, the load includes a generator, and engaging the load engages the generator, the generator does not draw power to act as a motor while engaged with the turbine.

(Embodiment 3) The system of embodiment 1, the load including a mass, engaging the load engages the mass altering the moment of inertia of the turbine, such that the turbine spins slower.

(Embodiment 4) The system of embodiment 1, the load including at least an electrical load.

(Embodiment 5) The system of embodiment 1, the load including at least a mechanical load, the system further comprising a clutch that engages the load to the turbine as a result of centrifugal force pulling arms of the clutch outwards during the first state.

(Embodiment 6) The system of embodiment 5, load also includes at least an electrical load further comprising: a switch that is configured to electrically engage the electrical load while the turbine is spinning at a speed above a third threshold value as a result of the switch being in a first state, the switch causes the electrical load to disengage from the turbine when the speed of the turbine is below a fourth threshold value, as result of the switch being in a second state, the first state being different from the second state, and the third threshold value being higher than the fourth threshold value.

(Embodiment 7) The system of embodiment 5, the arms being located on a first shaft each having a portion that engages a second shaft, one of the first and second shaft is associated with the turbine and the other of the first and second shaft is associated with the load, such that when the arms engage the second shaft the load is engaged to the turbine and when the arms disengage the second shaft the arms disengage from the turbine; the portion each of the arms that engages the second shaft are stationary with respect to the arms to which the portions are attached.

(Embodiment 8) The system of embodiment 1, further comprising: a speed sensor for determining the speed at which the turbine rotates; and a clutch, the speed sensor sending a signal to the clutch causing the clutch to place the load in one of the at least two states.

(Embodiment 9) The system of embodiment 1, further comprising a funnel, the turbine being located within the funnel, the funnel having an opening at one end of the funnel that is wider than other sections of the funnel, the funnel directing fluid towards the turbine, such that as the fluid travels towards the turbine within the funnel, the fluid travels towards a portion of the funnel that is narrower than the opening, the funnel being oriented about an axis that is parallel to an axis of the turbine, the funnel having a preferred direction for catching fluid, the preferred direction being parallel to the axis, such that a greater amount of fluid is caught by the funnel when the fluid travels in the preferred direction than when the fluid travels in another direction, fluid traveling in the preferred direction that is caught by the funnel tends to travel through the funnel in the preferred direction through the turbine and tends to power the turbine.

(Embodiment 10) The system of embodiment 1, the turbine having blades that are constructed from a rigid material.

(Embodiment 11) The system of embodiment 10, the electrical load engaging the turbine by at least the electrical load engaging a generator that is engaged with the turbine.

(Embodiment 12) A system comprising: a turbine for converting energy of a flowing medium into electrical energy; a load; and a mechanism that is configured to engage the load while the turbine is spinning, the load has at least two states, in a first of the at least two states the load is engaged with the turbine, slowing the speed at which the turbine spins, and then in a second of the at least two states the load is disengaged from the turbine, the mechanism causes the load to disengage from the turbine when the speed of the turbine is below a threshold value; the load includes a generator, and engaging the load engages the generator; the turbine including at least blades mounted on a first shaft that rotates, such that as a fluid flows passed that blades of the turbine, the fluid causes the blades to rotate; and as the blades rotate, the first shaft rotates with the blades, the generator including at least a stator having a stationary magnet that generates a magnetic field a second shaft, a rotator connected to the second shaft, the rotator includes at least coils of electrical wire, as the second shaft rotates, the rotator rotates, which generates an electric current in the coils; and the mechanism including at least a clutch for engaging the first shaft, which is connected to the turbine, to the second shaft, which is connected to the generator; the system further comprising: a speed sensor for sensing the speed at which blades of the turbine rotate, signals from the speed indicating a speed at which the turbine rotates; and a controller for causing the clutch to engage and disengage, based on the signals from speed sensor, which are received by the controller, the controller causing the clutch to engage the first shaft to the second shaft when the turbine spins at a speed above a first threshold speed, and the clutch to disengage when the turbine spins at a speed that is below a second threshold speed that is below the first threshold speed; and the controller also periodically engages and disengages the load from a turbine at fixed intervals of time, while the fluid flows at a fixed speed; the time interval being dependent on a fluid speed of the fluid.

(Embodiment 13) The system of embodiment 12 the load includes a mass, engaging the load engages the mass altering the moment of inertia of the turbine, such that the turbine spins slower.

(Embodiment 14) The system of embodiment 12, further comprising: an electrical load; a switch communicatively coupled to the load for electrically connecting and disconnecting the load to the generator, based on the signals from the speed sensor, which are received by the switch, the switch causing the electrical load to be electrically connected to the generator when the turbine spins at a speed above a third threshold speed, and the load to be electrically disconnected from the generator when the turbine spins at a speed below a fourth threshold speed that is lower than the third threshold.

(Embodiment 15) A system comprising: a turbine for converting energy of a flowing medium into electrical energy; a load; and a mechanism that is configured to engage the load while the turbine is spinning, the load has at least two states, in a first of the at least two states the load is engaged with the turbine, slowing the speed at which the turbine spins, and then in a second of the at least two states the load is disengaged from the turbine, the mechanism causes the load to disengage from the turbine when the speed of the turbine is below a threshold value; the load including at least an electrical load; the turbine including at least blades attached to a shaft, such that as a fluid flows passed the blades of the turbine, the blades rotate causing the shaft to rotate with the blades; the system further comprising a generator including at least a stator having a stationary magnet that generates a magnetic field a rotator coupled to the shaft, the rotator includes at least coils of electrical wire, as the shaft rotates, the rotator rotates, which generates an electric current in the coils; and a speed sensor for sensing the speed at which blades of the turbine rotate, signals from the speed indicating a speed at which the turbine rotates; and a switch communicatively coupled to the load for electrically connecting and disconnecting the load to the generator, based on the signals from the speed sensor, which are received by the switch, the switch causing the load to be electrically connected to the generator when the turbine spins at a speed above a first threshold speed, and the load to be electrically disconnected from the generator when the turbine spins at a speed below a second threshold speed that is lower than the first threshold speed.

(Embodiment 16) The system of embodiment 15, further comprising a mass that engages the shaft altering the moment of inertia of the turbine, such that the turbine spins slower.

(Embodiment 17) A method comprising: allowing a fluid to turn a turbine;

periodically engaging and disengaging a load from the turbine at intervals of time; the time intervals being dependent on a fluid speed of the fluid, such that for a constant fluid speed the time intervals are equal to one another.

(Embodiment 18) The method of embodiment 17, further comprising:

determining that the fluid speed is sufficient to drive the turbine while the load is disengaged, and the fluid speed is insufficient to keep the turbine turning while the load is engaged; and in response to the determining performing the periodically engaging and disengaging.

(Embodiment 19) The method of embodiment 17, the periodically engaging and disengaging being performed by at least engaging the load when the turbine speed is above a first threshold; and disengaging the load when the turbine speed is below a second threshold that is lower than the first threshold.

(Embodiment 20) The method of embodiment 17, the turbine having at least blades that rotate in response to a fluid passing by the blades, and a shaft that is connected to, and rotates with, the blades; the engaging includes at least moving a mass from a first position to a second position in which the mass is engaged with a portion of a shaft so that the mass rotates with the shaft; and the disengaging includes at least moving the mass from the second position to the first position so that the mass does not rotate with the shaft.

A system capable of converting fluid energy into electrical energy in conditions of low fluid flow is provided. In an embodiment, the system may engage and disengage an energy converter via an automatic clutch. In an embodiment, the transmission of energy to an energy converter is controlled by switching the energy converter on and off. In another embodiment, the flow of electrical energy to an electrical load is controlled by a switching device. In another embodiment, a funnel is used for condensing the flow of fluid moving through the system.

Other Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention. Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A device comprising:
a turbine shaft that is connected to a turbine, while in operation, the turbine shaft being driven by the turbine to rotate at a same angular velocity as the turbine;
a flywheel having an arm;
a weight attached to the arm;
the flywheel being always pivotally attached to the turbine shaft, such that
the arm spins with the turbine shaft,
the arm having a range of motion, as the turbine shaft spins, the arm swings outward, increasing a displacement between the weight and the shaft, therein increasing a moment of inertia of a combination of the arm, weight, and turbine shaft; wherein when the arm of the flywheel is maximally extended, the turbine is connected to the turbine shaft;
a mechanical bias biasing the arm to swing inwards, towards the shaft, therein biasing the arm to swing in a direction that reduces the moment of inertia of the combination of the arm, weight, and turbine shaft; the arm moving in response to changes in rotational velocity of the turbine shaft changing the moment of inertia throughout the range of motion of the arm.

2. A device comprising:
a turbine shaft that is connected to a turbine, while in operation, the turbine shaft being driven by the turbine to rotate at a same angular velocity as the turbine;
an arm;
a weight attached to the arm;
the arm being always pivotally attached at a first location to the turbine shaft while in operation, such that
the arm spins with the turbine shaft,
as the turbine shaft spins, the arm swings outward, increasing a displacement between the weight and the shaft, therein increasing a moment of inertia of a combination of the arm, weight, and turbine shaft;
the arm being a first arm, the weight being a first weight, the device further including at least:
a second arm, the second arm being located at a second location distance from the first arm along a length of the shaft, the second location having a fixed Orientation on the turbine shaft with respect to the first location;
a second weight attached to the second arm;
the second arm being always pivotally attached to the turbine shaft while in operation, such that
the second arm spins with the turbine shaft at the same angular velocity about the axis of the turbine shaft,
as the turbine shaft spins, the second arm swings outward, increasing a displacement between the second weight and the shaft, therein increasing a moment of inertia of a combination of the first arm, second arm, first weight, second weight, and turbine shaft.

3. The device of claim 2, the second arm being attached to the turbine shaft such that the second arm is oriented perpendicular to the first arm.

4. A device comprising:
a turbine shaft that is connected to a turbine, while in operation, the turbine shaft being driven by the turbine to rotate at a same angular velocity as the turbine;
an arm;
a weight attached to the arm;
the arm being pivotally attached to the turbine shaft while in operation, such that
the arm spins with the turbine shaft,
as the turbine shaft spins, the arm swings outward, increasing a displacement between the weight and the shaft, therein increasing a moment of inertia of a combination of the arm, weight, and turbine shaft;
the arm being a first arm, the weight being a first weight, the device further including at least:
a second arm, the second arm being located at a distance from the first arm along a length of the shaft;
a second weight attached to the second arm;
the second arm being pivotally attached to the turbine shaft while in operation, such that
the second arm spins with the turbine shaft at the same angular velocity about the axis of the turbine shaft, as the turbine shaft spins, the second arm swings outward, increasing a displacement between the second weight and the shaft, therein increasing a moment of inertia of a combination of the first arm, second arm, first weight, second weight, and turbine shaft;

the first arm and the first weight forming a first flywheel; the second arm and the second weight forming a second flywheel; the first flywheel being linked to and controlling the second flywheel via a linkage.

5. A device comprising:
a turbine shaft;
a first arm;
a first weight attached to the first arm;
the first arm pivotally attached to the turbine shaft, such that
  the first arm spins with the turbine shaft,
  as the turbine shaft spins, the first arm swings outward, increasing a displacement between the first weight and the shaft, therein increasing a moment of inertia of a combination of the first arm, first weight, and turbine shaft;
a second arm;
a second weight attached to the second arm;
the second arm pivotally attached to the turbine shaft, such that
  the second arm spins with the turbine shaft,
  as the turbine shaft spins, the second arm swings outward, increasing a displacement between the second weight and the shaft, therein increasing a moment of inertia of a combination of the first arm, second arm, first weight, second weight, and turbine shaft;
the first arm and the first weight forming a first flywheel;
the second arm and the second weight forming a second flywheel;
the first flywheel being linked to and controlling the second flywheel via a linkage; and
a pin preventing the second flywheel from rotating in at least one direction while the pin is engaged.

6. The device of claim 5, the first flywheel pulling the pin in a particular direction disengaging the pin allowing the second flywheel to rotate in the at least one direction.

7. The device of claim 5, the pin attached to a trigger having a portion located in a housing with wheels for rolling within the housing for engaging and disengaging the pin.

8. The device of claim 5, the pin attached to a spring that pushes the pin to engage the second flywheel.

9. The device of claim 5, the device further comprising a control arm connected to the first flywheel, as the first flywheel swings out, the control arm being moved in a direction that causes the pin to disengage if the control arm is moved past a particular location.

10. The device of claim 9, device further comprising a clutch control, the control arm moving a lever that switches the clutch control from a first state to a second state.

11. The device of claim 10, the control arm being a first control arm, the device further comprising a second control arm connected to the clutch control and the pin, when the clutch control is in the first state, the pin is mechanically biased to engage the second flywheel, and when the clutch control is in the second state the second control arm disengages the pin.

12. The device of claim 11, the lever being a first lever, the device further comprising a second lever that is connected to the second control arm, when the first lever moves past a first location, the first lever pushes the second lever from a first position to a second position, that moves the second control arm.

13. The device of claim 12, further comprising a spring that biases the second lever into the first position when the second lever is within a first range of locations and biases the second lever into the second position when the second lever is within a second range of positions.

14. The device of claim 5, further comprising a cover forming a housing that encloses the first flywheel.

15. The device of claim 5, the first arm having a third weight that is equal to the first weight and that is attached to a second end of the first arm.

16. The device of claim 15, the first weight being located on a first side of the shaft and the second weight being located on a second side of the shaft, such that as the arm extends the first weight and the second weight extend equal distances from the shaft.

17. The device of claim 15, the first weight being located on a first side of the shaft and the second weight being located on a second side of the shaft counter balancing the first side.

18. A method comprising:
allowing a turbine to rotate a turbine shaft that is connected to the turbine, the turbine shaft rotating at a same angular velocity of the turbine, when an arm of a flywheel is maximally extended the turbine is connected to the turbine shaft;
the centrifugal force of the rotating turbine shaft causing an arm to swing out away from the shaft, the arm being always pivotally attached to the turbine shaft while in operation;
the arm swinging out further as the turbine shaft rotates faster increasing the centrifugal force;
increasing a displacement of a weight of the flywheel from the shaft as the arm swings out, the weight being attached to the arm; and
increasing a moment of inertia of the turbine as a result of the displacement of the weight, the swinging out of the arm affecting a rotational velocity of the turbine by predominantly affecting the moment of inertia and affecting air resistance created by the flywheel.

19. A method comprising:
allowing a turbine to rotate a turbine shaft that is connected to the turbine, the turbine shaft rotating at a same angular velocity of the turbine;
the centrifugal force of the rotating turbine shaft causing an arm to swing out away from the shaft, the arm being always pivotally attached to the turbine shaft while in operation;
the arm swinging out further as the turbine shaft rotates faster increasing the centrifugal force;
increasing a displacement of a weight from the shaft as the arm swings out, the weight being attached to the arm; and
increasing a moment of inertia of the turbine as a result of the displacement of the weight;
wherein,
the arm being a first arm, the weight being a first weight, the method further including at least:
the centrifugal force of the rotating turbine shaft causing a second arm to swing out away from the shaft, the second arm being always pivotally attached to the turbine shaft while in operation, the second arm being located at a distance from the first arm along a length of the shaft;

the second arm swinging out further as the turbine shaft rotates faster increasing the centrifugal force;

increasing a displacement of a second weight from the shaft as the second arm swings out, the second weight being attached to the second arm; and increasing the moment of inertia of the turbine as a result of the displacement of the second weight the second arm and the second weight affecting how fast the turbine rotates predominantly by changing the moment of inertia of the turbine.

20. The method of claim 19, the second arm being attached to the turbine shaft such that the second arm has a fixed orientation with respect to the first arm and the second arm is oriented perpendicular to the first arm.

21. A method comprising:

allowing a turbine to rotate a turbine shaft that is connected to the turbine, the turbine shaft rotating at a same angular velocity of the turbine;

a centrifugal force from rotating the turbine shaft causing an arm to swing out away from the shaft, the arm being always pivotally attached to the turbine shaft while in operation;

the arm swinging out further as the turbine shaft rotates faster increasing the centrifugal force;

increasing a displacement of a weight from the shaft as the arm swings out, the weight being attached to the arm; and increasing a moment of inertia of the turbine as a result of the displacement of the weight;

wherein, the arm being a first arm, the weight being a first weight, the method further including at least:

the centrifugal force from rotating the turbine shaft causing a second arm to swing out away from the shaft, the second arm being always pivotally attached to the turbine shaft while in operation, the second arm being located at a distance from the first arm along a length of the shaft;

the second arm swinging out further as the turbine shaft rotates faster and as the centrifugal force increases;

increasing a displacement of a second weight from the shaft as the second arm swings out, the second weight being attached to the second arm; and increasing the moment of inertia of the turbine as a result of the displacement of the second weight;

the first arm and the first weight forming a first flywheel;

the second arm and the second weight forming a second flywheel; the method further including at least the first flywheel being linked to and controlling the second flywheel via a linkage.

22. A method comprising:

allowing a turbine to rotate a turbine shaft;

a centrifugal force from rotating the turbine shaft causing a first arm to swing out away from the turbine shaft;

the first arm swinging out further as the turbine shaft rotates faster increasing the centrifugal force;

increasing a displacement of a first weight from the shaft as the first arm swings out, the first weight being attached to the first arm;

increasing a moment of inertia of the turbine as a result of the displacement of the first weight;

the centrifugal force from the rotating of the turbine shaft causing a second arm to swing out away from the shaft;

the second arm swinging out further as the turbine shaft rotates faster increasing the centrifugal force;

increasing a displacement of the second weight from the shaft as the second arm swings out, the second weight being attached to the second arm;

increasing the moment of inertia of the turbine as a result of the displacement of the second weight;

the first arm and the first weight forming a first flywheel;

the second arm and the second weight forming a second flywheel;

the first flywheel controlling the second flywheel;

a pin engaging the second flywheel, therein preventing the second flywheel from rotating in at least one direction while the pin is engaged; and the second flywheel releasing the pin;

rotating the turbine shaft at a rotational velocity that is below a threshold, causing the first arm to swing outwards increasing the moment of inertia of the turbine, while the second arm is held in place in an initial position with the second arm;

rotating the turbine shaft at a rotational velocity that is above the threshold, causing the first arm to swing further outwards automatically releasing the second arm, so that the centrifugal force causes the second arm to swing outwards further increasing the moment of inertia of the turbine; and automatically reengaging the second arm and holding the second arm in place, when the second arm returns to the initial position.

23. A method comprising:

allowing a turbine to rotate a turbine shaft;

centrifugal force of rotating the turbine shaft causing a first arm to swing out away from the shaft;

the first arm swinging out further as the turbine shaft rotates faster increasing the centrifugal force;

increasing a displacement of a first weight from the shaft as the first arm swings out, the first weight being attached to the first arm;

increasing a moment of inertia of the turbine as a result of the displacement of the first weight;

the centrifugal force of the rotating of the turbine shaft causing a second arm to swing out away from the shaft;

the second arm swinging out further as the turbine shaft rotates faster increasing the centrifugal force;

increasing a displacement of the second weight from the shaft as the second arm swings out, the second weight being attached to the second arm;

increasing the moment of inertia of the turbine as a result of the displacement of the second weight;

the first arm and the first weight forming a first flywheel;

the second arm and the second weight forming a second flywheel;

the first flywheel controlling the second flywheel;

a pin engaging the second flywheel, therein preventing the second flywheel from rotating in at least one direction while the pin is engaged; and the second flywheel releasing the pin.

24. The method of claim 23, the method further comprising: the first flywheel pulling the pin in a particular direction disengaging the pin allowing the second flywheel to rotate in the at least one direction.

25. A device comprising:

a turbine shaft that is connected to a turbine;

a first arm;

a first weight attached to the first arm;

the first arm pivotally attached to the turbine shaft, such that the first arm spins with the turbine shaft, as the turbine shaft spins, the first arm swings outward, increasing a displacement between the first weight and the shaft, therein increasing a moment of inertia of a combination of the first arm, first weight, and turbine shaft;

a second arm;

a second weight attached to the second arm;

the second arm pivotally attached to the turbine shaft, such that the second arm spins with the turbine shaft, as the turbine shaft spins, the second arm swings outward, increasing a displacement between the second weight and the shaft, therein increasing a moment of inertia of a combination of the first arm, second arm, first weight, second weight, and turbine shaft;

wherein the first arm and the first weight form a first flywheel, and the second arm and the second weight form a second flywheel, the first flywheel being linked to and controlling the second flywheel via a linkage.

26. The device of claim 25, further comprising a clutch, via which the first arm controls the second arm, the clutch having two states, in a first of the two states, the clutch holds the second arm in place preventing the second arm from swinging outwards, the clutch being mechanically biased to be in the first state; and in a second of the two states, the clutch releases the second arm allowing the second arm to swing outwards, the clutch being coupled to the first arm, such that when the first arm extends outwards, the first arm causes the clutch to release the second arm.

the first arm being coupled to the clutch, such that when the turbine spins at a rotational velocity that is above a predetermined threshold, the first arm swings out and causes the clutch to switch from the first state to the second state.

27. A device comprising:

a turbine shaft that is connected to a turbine, the turbine shaft being driven by the turbine to rotate at a same angular velocity of the turbine;

an arm;

a weight attached to the arm;

the arm being always pivotally attached to the turbine shaft while in operation, such that the arm spins with the turbine shaft, as the turbine shaft spins, the arm swings outward, increasing a displacement between the weight and the shaft, therein increasing a moment of inertia of a combination of the arm, weight, and turbine shaft; wherein, the arm being oriented such that when the turbine shaft is not rotating the arm is oriented parallel to a rotational axis of the turbine shaft and the weight is in contact with the shaft or the weight is within the shaft.

28. A device comprising:

a turbine shaft that is connected to a turbine, while in operation, the turbine shaft being driven by the turbine to rotate at a same angular velocity as the turbine;

a flywheel having an arm;

a weight attached to the arm;

the flywheel being always pivotally attached, by a pivot, to the turbine shaft, such that the arm spins with the turbine shaft, such that as the turbine shaft spins, the arm swings outward, increasing a displacement between the weight and the shaft, therein increasing a moment of inertia of a combination of the arm, weight, and turbine shaft; wherein when the arm of the flywheel is maximally extended, the turbine is connected to the turbine shaft;

a mechanical bias biasing the arm to swing inwards, towards the shaft, therein biasing the arm to swing in a direction that reduces the moment of inertia of the combination of the arm, weight, and turbine shaft; the flywheel being attached to the device only by the pivot and the mechanical bias, the mechanical bias being attached only to the shaft and the flywheel.

\* \* \* \* \*